(12) United States Patent
Ogawa et al.

(10) Patent No.: US 7,811,734 B2
(45) Date of Patent: Oct. 12, 2010

(54) HYDROPHOBIC INORGANIC FINE PARTICLES AND TONER

(75) Inventors: Yoshihiro Ogawa, Yokohama (JP);
Yusuke Hasegawa, Suntou-gun (JP);
Kouji Nishikawa, Susono (JP); Miho Okazaki, Suntou-gun (JP); Yoshitaka Suzumura, Mishima (JP); Takashige Kasuya, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/562,264

(22) Filed: Sep. 18, 2009

(65) Prior Publication Data
US 2010/0009277 A1    Jan. 14, 2010

Related U.S. Application Data

(63) Continuation of application No. PCT/JP2009/059298, filed on May 14, 2009.

(30) Foreign Application Priority Data

May 16, 2008    (JP)    ............... 2008-129044

(51) Int. Cl.
*G03G 9/08*    (2006.01)
*B23B 1/00*    (2006.01)
(52) U.S. Cl. .................. 430/108.6; 430/108.7; 428/405
(58) Field of Classification Search .............. 430/108.7; 428/405
See application file for complete search history.

(56) References Cited

U.S. PATENT DOCUMENTS

| | | | |
|---|---|---|---|
| 5,215,849 A * | 6/1993 | Makuta et al. ............ 430/108.3 |
| 5,486,420 A | 1/1996 | Nishihara et al. ............ 428/405 |
| 5,700,616 A | 12/1997 | Kasuya et al. ............... 430/110 |
| 5,712,073 A | 1/1998 | Katada et al. ................ 430/110 |
| 5,900,315 A * | 5/1999 | Little .......................... 428/405 |
| 6,060,202 A | 5/2000 | Ogawa et al. ................ 430/111 |
| 7,014,975 B2 * | 3/2006 | Barthel et al. .......... 430/123.51 |
| 7,123,862 B2 | 10/2006 | Hasegawa et al. ........... 399/223 |

(Continued)

FOREIGN PATENT DOCUMENTS

JP    59-053856    3/1984

(Continued)

OTHER PUBLICATIONS

PCT/JP2009/059298 International Search Report (10 pages).

*Primary Examiner*—John L Goodrow
(74) *Attorney, Agent, or Firm*—Fitzpatrick, Cella, Harper & Scinto

(57) ABSTRACT

Hydrophobic inorganic fine particles are provided which: does not cause melt adhesion of toner to a photosensitive member and contamination of a contact charging member; imparts excellent flowability, charging performance and durability to toner even after the toner is stored in a high-temperature, high-humidity environment over a long time period; and does not cause dripping of toner and contamination with the toner. The hydrophobic inorganic fine particles are obtained by subjecting inorganic fine particles to surface treatment with silicone oil and then with a silane compound and/or a silazane compound, or by subjecting inorganic fine particles to surface treatment with a silane compound and/or a silazane compound in the presence of silicone oil, and further subjecting the inorganic fine particles thus surface-treated to surface treatment with silicone oil.

6 Claims, 2 Drawing Sheets

U.S. PATENT DOCUMENTS

| | | |
|---|---|---|
| 7,238,387 B2 | 7/2007 | Ogawa et al. ............... 427/219 |
| 7,402,368 B2 | 7/2008 | Ogawa et al. ............ 430/108.1 |

FOREIGN PATENT DOCUMENTS

| | | |
|---|---|---|
| JP | 59-061842 | 4/1984 |
| JP | 06-227810 | 8/1994 |
| JP | 07-113783 | 5/1995 |
| JP | 2002-256170 | 9/2002 |
| JP | 2004-168559 | 6/2004 |
| JP | 2005-060214 | 3/2005 |
| JP | 2007-176747 | 7/2007 |
| WO | WO 2007-110920 A1 | 10/2007 |

* cited by examiner

HYDROPHOBIC INORGANIC FINE PARTICLES AND TONER

CROSS-REFERENCE TO RELATED APPLICATIONS

This application is a continuation of International Application No. PCT/JP2009/059298, filed May 14, 2009, which claims the benefit of Japanese Patent Application No. 2008-129044, filed May 16, 2008.

BACKGROUND OF THE INVENTION

1. Field of the Invention

The present invention relates to hydrophobic inorganic fine particles for use in an image-forming method such as an electrophotographic method, an electrostatic printing method or a toner jet method, and a toner containing the hydrophobic inorganic fine particles.

2. Description of the Related Art

It has been generally known that inorganic fine particles are externally added to toner particles for the following purpose of adjusting the charging performance, flowability and the like of the toner so that a good developing property can be obtained. Wet process silica, dry process silica, titanium oxide, alumina or the like has been conventionally used as hydrophobic inorganic fine particles, and a proposal has been made that inorganic fine particles is subjected to hydrophobic treatment in order that the environmental stability of the charging of toner may be improved.

Surface treatment with, for example, a silane compound, a silazane compound or a silicone oil has been performed as hydrophobic treatment for those inorganic fine particles.

For example, an approach has been adopted in which a reaction treatment agent such as dimethyldichlorosilane or hexamethyldisilazane, and hydrophilic inorganic fine particles are brought into contact with each other, and a hydroxyl group present on the surface of the hydrophilic inorganic fine particle and the treatment agent are allowed to react with each other so that the hydrophilic inorganic fine particle can be made hydrophobic.

However, a hydrophobic group introduced to the surface of the inorganic fine particle by such a treatment agent has a large molecular size, and the hydrophobic group is unable to reach an adjacent hydroxyl group owing to steric hindrance. As a result, a hydroxyl group is left which does not react and hence is not made hydrophobic, so sufficient hydrophobicity cannot be imparted to the inorganic fine particle in some cases.

In addition, it is difficult to uniformly subject the surfaces of inorganic fine particles to surface treatment with silicone oil because the silicone oil has a relatively high molecular weight and high viscosity.

In particular, when toner is stored in a high-temperature, high-humidity environment over a long time period before being used, the external addition of inorganic fine particles which have not been subjected to sufficient hydrophobic treatment to toner may involve such a problem that the flowability and charging performance of the toner is lowered owing to inorganic fine particles having absorbed moisture, and hence the quality of an image formed from the toner deteriorates. Further, when such a stored toner is used for a long time, the toner deteriorates so that its flowability and charging performance is remarkably lowered. As a result, the toner (transfer residual toner) remaining on a photosensitive member without being transferred onto a transfer material such as paper is not collected in a cleaning container, and drips to cause image defects or contamination in an image-forming apparatus in some cases.

Japanese Patent Publication No. H07-113783 discloses a negatively chargeable electrophotographic developer characterized by containing: a negatively chargeable silicate fine powder having been treated with hexamethyldisilazane or a silane coupling agent, and then further treated with a silicone oil; and toner.

According to the method, the degree of hydrophobicity of the silica increases because a hydroxyl group which was not treated with hexamethyldisilazane or the silane coupling agent is made hydrophobic by the silicone oil. However, most of the silicone oil in the treatment is not immobilized onto the surface of the silica, and so, a problem is raised in some case in that when the silica is stored under a high-temperature, high-humidity environment for a long time period in a state of being externally added to the toner, the toner is apt to absorb moisture so that its charging is inhibited.

Japanese Patent Application Laid-Open No. 2002-256170 discloses a hydrophobic silica powder obtained by subjecting a raw silica powder to surface-treatment with a polysiloxane and a trimethylsilylating agent, the hydrophobic silica powder being characterized in that: 0.3 to 1.5 trimethylsilyl groups are present per 1 $nm^2$ of the surface area of the raw silica powder; and the polysiloxane adheres in an amount of A/20 to A/5 parts by mass (where A represents the specific surface area ($m^2/g$) of the raw silica powder) with respect to 100 parts by mass of the raw silica powder. In addition, a method of producing the hydrophobic silica powder is disclosed which includes treating a silica powder with a polysiloxane and then with a trimethylsilylating agent.

Japanese Patent Application Laid-Open No. 2004-168559 discloses a highly dispersible, highly hydrophobic silica powder characterized in that: the silica powder has a hydrophobicity rate of 95% or more and a hydrophobicity degree of 76% or more; and the silica powder has such a distribution density that its particle sizes are concentrated in a range of 10 to 70 μm. In addition, a method of producing the highly dispersible, highly hydrophobic silica powder is disclosed which includes the steps of: subjecting silica to primary surface treatment with a silicone oil treatment agent; after the primary surface treatment, disintegrating the treated product; and after the disintegration, subjecting the disintegrated products to secondary surface treatment with an alkylsilazane treatment agent.

In these methods, silica is subjected to surface treatment with a silicone oil, and is then subjected to hydrophobic treatment with a treatment agent such as hexamethyldisilazane, and so, the silicone oil can be easily immobilized onto the silica surfaces, and the hydrophobicity degree of silica can be increased in a state that the amount of liberated silicone oil is reduced. However, the amount of liberated silicone oil which is not immobilized onto the surfaces of the silica particles becomes extremely small, and so, problems are liable to occur such that contamination of a contact charging member due to adhesion of the silica powder to the member, or the melt adhesion of a toner containing the silica powder to a photosensitive member.

Japanese Patent Application Laid-Open No. 2007-176747 discloses a surface-coated silica obtained by subjecting silica to coating treatment with two or more different types of silicone oils, the surface-coated silica being characterized in that: the amount of silicone oils extracted with chloroform accounts for 5 to 95 mass % of the amounts of all the coated silicone oils; and at least one type of silicone oil is not included in the extracted silicone oils.

In this method, the abundance of liberated silicone oil on the silica surfaces can be controlled, but it is difficult for silicone oil to penetrate fine irregularities on the silica surfaces because its molecular weight is larger than that of a reaction treatment agent such as dimethyldichlorosilane or hexamethyldisilazane. Accordingly, hydroxyl groups which have not been subjected to hydrophobic treatment are apt to remain on the silica surfaces, so that when a toner is stored in a high-temperature, high-humidity environment over a long time period before being used, inorganic fine particles absorb moisture to inhibit charging and to cause image quality deteriorate in some cases.

Thus, it is desired that inorganic fine particles are developed which can provide toner with charging performance and flowability which are stable irrespective of a circumstance under which the toner is stored and an environment in which the toner is used.

SUMMARY OF THE INVENTION

An object of the present invention is to provide hydrophobic inorganic fine particles that have solved such problems as described above, and a toner containing the hydrophobic inorganic fine particles.

That is, the object of the present invention is to provide hydrophobic inorganic fine particles which do not cause the melt adhesion of a toner to a photosensitive member and the contamination of a contact charging member and can impart excellent flowability, excellent charging performance and excellent durability to a toner even after being stored in a high-temperature, high-humidity environment over a long time period.

To achieve the above object, a first invention according to the present application provides hydrophobic inorganic fine particles containing at least a silicone oil, the hydrophobic inorganic fine particles being characterized in that the hydrophobic inorganic fine particles are obtained by subjecting inorganic fine particles to surface treatment with silicone oil and then with one or two or more types of treatment agents selected from silane compounds and silazane compounds, or by subjecting inorganic fine particles to surface treatment with one or two or more types of treatment agents selected from silane compounds and silazane compounds in the presence of silicone oil and then with silicone oil, and further subjecting the inorganic fine particles thus surface-treated to surface treatment with silicone oil.

According to the present invention, hydrophobic inorganic fine particles can be provided which can favorably suppress the melt adhesion of a toner to a photosensitive member and the contamination of a contact charging member, and can impart excellent flowability, excellent charging performance and excellent durability to a toner even after being stored in a high-temperature, high-humidity environment over a long time period, and do not cause the dripping of toner and contamination with toner in an image forming apparatus.

Figure 1:
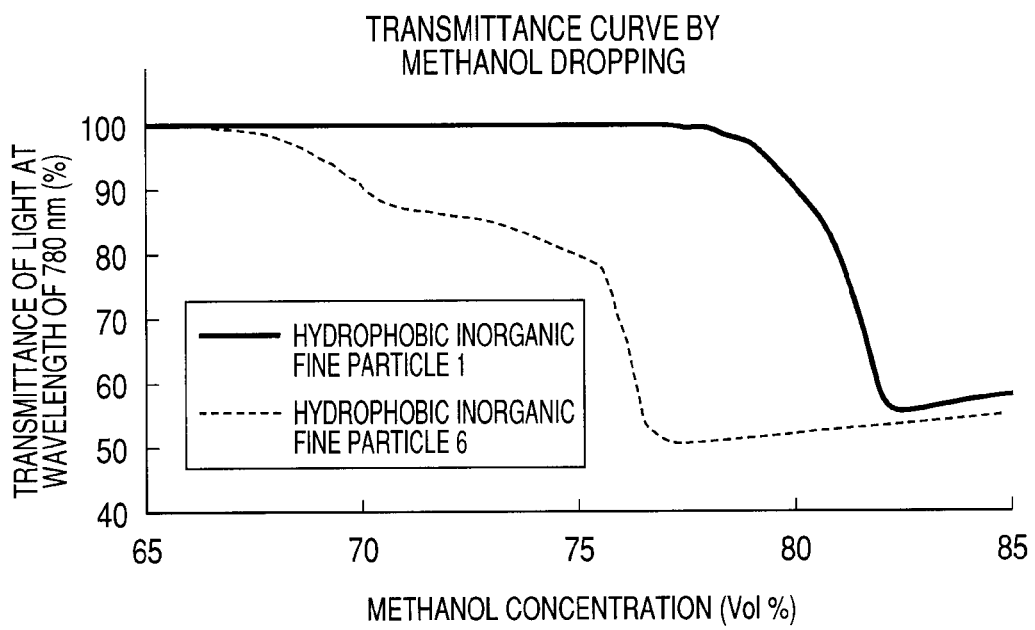
FIG. 1 is a graph illustrating changes in light transmittances of Hydrophobic Inorganic Fine Particles 1 and 6 of the present invention with respect to methanol concentration.

DESCRIPTION OF REFERENCE CHARACTERS 1 developing apparatus
2 developer container
3 latent image bearing member
4 transferring means
5 laser beam or analog beam
6 developing sleeve
7 heat and pressure fixing means
8 cleaning blade
9 elastic blade
11 charger
12 bias applying means
13 magnetic developer
14 cleaning means
15 magnetic field generating means
21 photosensitive member
22 contact charging member
22a mandrel
23 developing apparatus
23a developing sleeve
23b elastic blade
24 cleaning apparatus
24a cleaning blade
24b scooping sheet
25 frame
26 opening for image exposure

DESCRIPTION OF THE EMBODIMENTS

When toner is stored in a high-temperature, high-humidity environment (such as an environment having a temperature of 40° C. or higher and a humidity in excess of 95%) for a long time period over one month or more, the toner deteriorates owing to heat, or absorbs moisture, and so, the charging performance and flowability of the toner may be reduced. As a result, a problem is raised in that image quality is lowered, such as a decrease in image density, an increase in fogging, deterioration in reproducibility of fine dots.

Further, when toner stored for a long time period is used in a high-temperature, high-humidity environment over a long time period, the charging performance and flowability of the toner may be remarkably lowered as compared with those in the case where the toner having no history of storage is used. This is because the degree of deterioration of the toner, which has already deteriorated owing to the storage, is further increased by the long-term use.

When development is performed on a photosensitive member with the toner in such a remarkable deterioration state, the toner is difficult to transfer onto a transfer material such as paper owing to its low charge quantity, and a large amount of the toner is apt to remain on the photosensitive member. The toner remaining on the photosensitive member without being transferred (transfer residual toner) is typically scraped off from the photosensitive member with a cleaning member such as a cleaning blade abutting on the photosensitive member so as to be placed in a cleaning container.

However, when the charging performance and flowability of the toner is reduced remarkably, the electrostatic attraction force between the transfer residual toner and the photosensitive member is reduced, and the toner is liable to aggregate, and a state is created in which the transfer residual toner is apt to fall off the surface of the photosensitive member owing to a slight stimulus such as vibration or rubbing. In particular, when images each having a high print percentage are printed, the amount of the transfer residual toner increases, so the above state becomes more remarkable.

For example, the transfer residual toner is rubbed with the scooping sheet portion of the cleaning container abutting on the surface of the photosensitive member, and the toner falls (drips) off the photosensitive member before entering the cleaning container, thereby contaminating the inside of an image-forming apparatus or dropping onto paper to cause black spots.

The inventors of the present invention have conducted extensive studies on image defects and deterioration in image quality due to such toner stored in a high-temperature, high-humidity environment over a long time period, and the dripping of the toner. As a result, the inventors have found that those problems can be significantly alleviated by improving hydrophobic inorganic fine particles externally added to the particles of the toner.

The hydrophobic inorganic fine particles of the present invention are characterized in that they are obtained by subjecting inorganic fine particles to be treated to the following treatment (1) or (2):

(1) conducting surface treatment with a silicone oil, and thereafter, surface treatment with one or two or more types of organosilicon compounds selected from silane compounds and silazane compounds; or (2) conducting surface treatment with one or two or more types of organosilicon compounds selected from silane compounds and silazane compounds in the presence of silicone oil, and further subjecting the inorganic fine particles thus subjected to the above surface treatment to surface treatment with silicone oil.

The term "inorganic fine particles to be treated" as used in the present invention refers to inorganic fine particles before being subjected to the treatments according to the present invention.

When the inorganic fine particles are treated with the silane compound or the silazane compound after having been treated with the silicone oil, or are treated with the silane compound or the silazane compound in the presence of the silicone oil, the immobilization ratio of the silicone oil onto the surfaces of the inorganic fine particles can be increased. As a result, the hydrophobicity degree of the surfaces of the inorganic fine particles can be increased. What is important here is that the inorganic fine particles to be treated which have not been subjected to any hydrophobic treatment are treated with the silicone oil. The inorganic fine particles are particularly preferably treated with the silane compound or the silazane compound after having been treated with the silicone oil in terms of uniform surface treatment and an increase in hydrophobicity degree.

That is, when the inorganic fine particles are treated with silicone oil in a state in which the inorganic fine particles have not been subjected to any hydrophobic treatment and hence a large number of hydroxyl groups are present on the surfaces of the inorganic fine particles, the adhesiveness between each inorganic fine particle and the silicone oil is improved, so that the immobilization ratio can be increased. As a result, even when a toner is stored in a high-temperature, high-humidity environment over a long time period, the hydrophobic inorganic fine particles hardly absorb moisture, and hence the charging performance of the toner can be inhibited from decreasing.

Since fine irregularities on the surfaces of the inorganic fine particles which cannot be completely treated with the silicone oil are subjected to hydrophobic treatment with the silane compound or silazane compound which enters the fine irregularities more easily than the silicone oil does, inorganic fine particles uniformly subjected to hydrophobic treatment without unevenness can be obtained.

However, in such treatment as described above, the immobilization ratio of silicone oil is high and the hydrophobicity degree of the inorganic fine particles is increased, but the amount of liberated silicone oil which is not immobilized onto the surfaces of the inorganic fine particles is reduced. As a result, when the inorganic fine particles are externally added to toner, the releasability of the toner from a photosensitive member or contact charging member is lowered, and the melt adhesion of toner to the photosensitive member occurs, or the contact charging member is contaminated so as to be responsible for defective charging.

In view of the foregoing, in the present invention, the inorganic fine particles which have been made hydrophobic by the above treatment are further treated with silicone oil. As a result, liberated silicone oil which is not immobilized onto the surfaces of the inorganic fine particles can be provided for the hydrophobic inorganic fine particles.

In the present invention, the degree of hydrophobicity of the inorganic fine particles has already been sufficiently increased by the treatment with the silicone oil and the treatment with the silane compound or silazane compound. When such inorganic fine particles are further treated with silicone oil, a proper amount of liberated silicone oil can be allowed to exist.

The liberated silicone oil imparts good flowability to toner to inhibit defective charging from occurring. In addition, since a proper amount of oil is applied to the photosensitive member, the melt adhesion of toner to the photosensitive member can be inhibited from occurring. Further, the hydrophobicity degree can be additionally increased because the liberated silicone oil has also such a effect that hydroxyl groups on the surfaces of the inorganic fine particles which have not been completely treated by the treatment are made hydrophobic.

In addition, even when the hydrophobic inorganic fine particles are further used over a long time period after having been stored in a high-temperature, high-humidity environment over a long time period in a state of being externally added to toner, the charging performance and flowability of the toner is difficult to change, and the contamination of the inside of an image-forming apparatus due to the dripping of the toner or black spots can be inhibited from occurring.

In contrast, when untreated inorganic fine particles are subjected to surface treatment with silicone oil after having been treated with the silane compound or silazane compound, the number of hydroxyl groups on the surfaces of the inorganic fine particles is small, and so, the silicone oil is difficult to immobilize onto the surfaces of the inorganic fine particles. As a result, the silicone oil is apt to liberate from the surfaces of the inorganic fine particles, and a portion which is not made hydrophobic remains. Thus, when the inorganic fine particles are stored in a high-temperature, high-humidity environment over a long time period in a state of being externally added to toner, the toner absorbs moisture to be reduced in its charging performance, so that the contamination of the inside of an image-forming apparatus due to the dripping of the toner or black spots may occur.

In addition, when untreated inorganic fine particles are treated with the silane compound or silazane compound, only a certain amount of the silane compound or silazane compound is fixed to the inorganic fine particles, and so, the hydrophobicity degree of the inorganic fine particles cannot be increased beyond a certain level. Therefore, a large amount of silicone oil must be added in order that a hydrophobicity degree higher than a certain level can be obtained in the above treatment. However, when the addition amount of silicone oil is excessively large, deterioration in the flowability of toner or image fogging occurs owing to excessive silicone oil.

The hydrophobic inorganic fine particles of the present invention are preferably obtained by subjecting 100 parts by mass of the inorganic fine particles to be treated to the surface treatment with a total of 5 parts by mass or more and 50 parts by mass or less (more preferably 10 parts by mass or more and 40 parts by mass or less) of silicone oil. The amount of silicone oil used in the surface treatment is the total amount of silicone oil used in the surface treatment for the inorganic fine particles. As long as the amount of the silicone oil used in the surface treatment falls within the above range, the hydrophobicity degree is additionally increased, and the good environmental stability of charging of the toner can be obtained. In addition, since a proper amount of liberated silicone oil is present, the good flowability of toner can be acquired, and silicone oil is inhibited from contaminating the surfaces of the toner particles to lower the charging performance of toner.

Further, in the present invention, when the BET specific surface area ($m^2/g$) of the inorganic fine particles to be treated is represented by S, the amount of the silicone oil used in the first treatment for the inorganic fine particles is preferably $0.01 \times S$ parts by mass or more and $0.20 \times S$ parts by mass or less, or more preferably $0.05 \times S$ parts by mass or more and $0.15 \times S$ parts by mass or less with respect to 100 parts by mass of the inorganic fine particles.

The silicone oil used in the first treatment is preferably added in a proper amount in accordance with the specific surface area of the inorganic fine particles because it is desirable that the silicone oil is immobilized onto the surfaces of the inorganic fine particles so as to be prevented from being liberated. When the addition amount of the silicone oil is larger than $0.20 \times S$ parts by mass, the amount of liberated silicone oil increases, and hence, fogging becomes more remarkable in some cases, and when the addition amount is smaller than $0.01 \times S$ parts by mass, the hydrophobicity degree is reduced, and hence, black spots or the contamination of the inside of an image-forming apparatus due to the dripping of the toner may become more remarkable.

The surface treatment for the inorganic fine particles with the silane compound or silazane compound is performed by adding preferably 1 part by mass or more and 50 parts by mass or less, more preferably 5 parts by mass or more and 40 parts by mass or less, or still more preferably 15 parts by mass or more and 35 parts by mass or less of the treatment agent, to 100 parts by mass of the inorganic fine particles to be treated.

As long as the amount of the silane compound or silazane compound falls within the above range, the hydrophobicity degree is additionally increased, and hence the contamination of the inside of an image-forming apparatus due to the dripping of the toner or black spots can be prevented from occurring.

In the present invention, the treatment for the inorganic fine particles with the silane compound or silazane compound can be performed by a generally known method. Examples of the method include: a dry process in which the inorganic fine particles are brought into a cloud state and allowed to react with the silane compound or silazane compound; and a wet process in which the inorganic fine particles are dispersed in a solvent and allowed to react with the silane compound or silazane compound which is dropwise added.

In addition, the amount of the silicone oil used in the treatment after the surface treatment with the silane compound or silazane compound is desirably $0.01 \times S$ parts by mass or more and $0.10 \times S$ parts by mass or less, or preferably $0.01 \times S$ parts by mass or more and $0.05 \times S$ parts by mass or less.

In order that the melt adhesion of toner to a photosensitive member and defective charging due to the contamination of a contact charging member can be inhibited from occurring, it is desirable that the silicone oil added in the treatment is not immobilized onto the surfaces of the inorganic fine particles.

As long as the amount of the silicone oil after the surface treatment with the silane compound or silazane compound falls within the above range, good flowability is imparted to toner, so that fogging can be inhibited from occurring, and at the same time, the melt adhesion of toner to a photosensitive member and defective charging can be prevented from occurring.

The immobilization ratio of silicone oil onto the surfaces of the inorganic fine particles represents the degree of easiness with which the silicone oil is liberated from the surfaces of the inorganic fine particles, and the inorganic fine particles and the silicone oil are not necessarily required to be allowed to chemically react with each other. A method of measuring the immobilization ratio of the silicone oil is described below.

[Method of Measuring Immobilization Ratio of Silicone Oil]

(Extraction of Liberated Silicone Oil)
1. 0.5 g of the inorganic fine particles and 40 ml of chloroform are placed in a beaker, and the mixture is stirred for 2 hours.
2. The stirring is stopped, and the resultant is left at rest for 12 hours.
3. The sample is filtered, and the filtrate is washed with 40 ml of chloroform three times.
4. Chloroform is removed from the inorganic fine particles by drying under reduced pressure.

(Measurement of Carbon Amount)

As described below, a sample is burnt in a stream of oxygen at a temperature of $1,100°$ C. The amounts of CO and $CO_2$ generated by the burning are measured on the basis of IR absorbance, and the carbon amount in the sample is measured. Then, the immobilization ratio of a silicone oil is calculated by comparing a carbon amount before the extraction of the silicone oil and a carbon amount after the extraction.

1. 2 g of the sample are placed into a cylindrical die and pressed.
2. 0.15 g of the pressed sample is precisely weighed, placed on a board for burning, and subjected to measurement with an EMA-110 manufactured by HORIBA, Ltd.

As described below, carbon amount measurement is performed by collecting a measurement sample at each step of the hydrophobic treatment for the inorganic fine particles.

(1) Inorganic fine particles subjected to first silicone oil treatment (a carbon amount at this moment is represented by C1).

(2) Inorganic fine particles from which liberated silicone oil is extracted after the first silicone oil treatment (a carbon amount at this moment is represented by C2).

(3) Inorganic fine particles subjected to the surface treatment with the silane compound or silazane compound after the first silicone oil treatment (a carbon amount at this moment is represented by C3).

(4) Inorganic fine particles subjected to the surface treatment with the silane compound or silazane compound and then to second silicone oil treatment after the first silicone oil treatment (a carbon amount at this moment is represented by C4).

(5) Inorganic fine particles from which liberated silicone oils are extracted after the surface treatment with the silane compound or silazane compound and the second silicone oil treatment after the first silicone oil treatment (a carbon amount at this moment is represented by C5).

The immobilization ratio of the silicone oil in the first treatment is determined by the following calculation.

Immobilization ratio of silicone oil in first treatment (%)=(C2/C1)×100

The immobilization ratio of the silicone oil in the second treatment is determined by the following calculation.

Immobilization ratio of silicone oil in second treatment (%)=100−(((C4−C5)−(C1−C2))/(C4−C3))×100

The immobilization ratio of all silicone oils is determined by the following calculation.

Immobilization ratio of all silicone oils (%)=100−((C4−C5)/(C1+C4−C3))×100

The hydrophobic inorganic fine particles have an immobilization ratio of the silicone oils of preferably 10 mass % or more and 90 mass % or less, more preferably 30 mass % or more and 80 mass % or less, or still more preferably 50 mass % or more and 80 mass % or less. The presence of silicone oil immobilized onto the surfaces of the inorganic fine particles and silicone oil which is not immobilized can achieve the compatibility between a high hydrophobicity degree and the releasability of the toner from a photosensitive member or contact charging member.

Further, the immobilization ratio of the silicone oil in the inorganic fine particles before the second silicone oil treatment is preferably 50% or more, more preferably 70% or more, or still more preferably 80% or more. The immobilization ratio of the silicone oil is increased to thereby increase the hydrophobicity degree of the hydrophobic inorganic fine particles. Therefore, even when a toner containing the hydrophobic inorganic fine particles is stored in a high-temperature, high-humidity environment over a long time period, the silicone oil is more difficult to liberate from the surfaces of the inorganic fine particles, and the charging performance of the toner due to moisture absorption can be favorably inhibited from being lowered.

The immobilization ratio of the silicone oil onto the inorganic fine particles in the silicone oil treatment performed after the surface treatment with the silane compound or silazane compound is preferably 40% or less, more preferably 30% or less, or still more preferably 20% or less. The immobilization ratio of the silicone oil is reduced, whereby the releasability of the toner from a photosensitive member or contact charging member can be improved and a releasing effect can be exhibited by using a smaller amount of silicone oil. Therefore, the amount of the silicone oil to be added to the inorganic fine particle suffices can be reduced, and the flowability of the toner can be maintained at a good level.

In the hydrophobic inorganic fine particles, the inorganic fine particles before being subjected to the hydrophobic treatment have a BET specific surface area of preferably 10 m$^2$/g or more and 500 m$^2$/g or less, more preferably 50 m$^2$/g or more and 400 m$^2$/g or less, or still more preferably 100 m$^2$/g or more and 350 m$^2$/g or less.

Examples of the inorganic fine particles include oxides such as wet process silica, dry process silica, titanium oxide, alumina, zinc oxide, and tin oxide, double oxides such as strontium titanate, barium titanate, calcium titanate, strontium zirconate and calcium zirconate, and carbonate compounds such as calcium carbonate and magnesium carbonate. For the improvement of the developing property and flowability, the inorganic fine particles are preferably selected from silica, titanium oxide, alumina, and double oxides thereof.

A fine powder produced by vapor-phase oxidation of a silicon halide, the so-called dry process silica or fumed silica, is particularly preferable because high charging performance and high flowability can be achieved. The fine powder is, for example, one obtained by utilizing a thermal decomposition oxidation reaction of a silicon tetrachloride gas in oxyhydrogen flame, and a reaction formula that provides a basis for the reaction is as described below. $SiCl_4+2H_2O_2 \rightarrow SiO_2+4HCl$ A composite fine powder of silica and any other metal oxides can also be obtained by using any other metal halides such as aluminum chloride or titanium chloride and the silicon halide in combination in the production process, and the composite fine powder is also included in the silica used in the present invention.

The hydrophobic inorganic fine particles used in the present invention are applicable to both a negatively chargeable toner and a positively chargeable toner.

Examples of the silicone oil include an amino-modified, epoxy-modified, carboxyl-modified, carbinol-modified, mathacryl-modified, mercapto-modified, phenol-modified, polyether-modified, methylstyryl-modified, alkyl-modified, fatty acid-modified, alkoxy-modified and fluorine-modified silicones, dimethyl silicone, methylphenyl silicone, diphenyl silicone, and methyl hydrogen silicone.

Of those silicone oils, silicone oil is preferred having as a substituent an alkyl group, an aryl group or alkyl group in which part or all of hydrogen groups are substituted by fluorine atoms, or hydrogen. Specifically, dimethyl silicone oil, methylphenyl silicone oil, methyl hydrogen silicone oil, and fluorine-modified silicone oil may be cited.

Such silicone oil has a viscosity at 25° C. of preferably 5 to 2,000 mm$^2$/s, more preferably 10 to 1,000 mm$^2$/s, or still more preferably 30 to 500 mm$^2$/s. When the viscosity is less than 5 mm$^2$/s, the hydrophobic inorganic fine particles may be unable to obtain sufficient hydrophobicity, and when the viscosity exceeds 2,000 mm$^2$/s, it becomes difficult to treat the inorganic fine particles uniformly, or aggregates of the particles are apt to be formed, and so, the toner containing the particles may be unable to obtain sufficient flowability.

In the present invention, the silicone oil used in the first silicone oil treatment and the silicone oil used in the subsequent treatment may be identical to or different from each other.

Examples of the silane compound include alkoxy silanes such as methoxy silane, ethoxy silane and propoxy silane, halosilanes such as chlorosilane, bromosilane and iodosilane, hydrosilanes, alkyl silanes, aryl silanes, vinyl silanes, acryl silanes, epoxy silanes, silyl compounds, siloxanes, silyl ureas, silyl acetamides, and silane compounds having different types of substituents that those silane compounds have simultaneously. By using those silane compounds, flowability, transferring property, and charge stability can be obtained. A plurality of those silane compounds may be used.

Specific examples thereof include trimethyl silane, trimethylchloro silane, trimethylethoxy silane, dimethyldichloro silane, methyltrichloro silane, allyldimethylchloro silane, allylphenyldichloro silane, benzyldimethylchloro silane, bromomethyldimethylchloro silane, α-chloroethyltrichloro silane, β-chloroethyltrichloro silane, chloromethyldimethylchloro silane, triorganosilylmercaptane, trimethylsilylmercaptane, triorganosilyl acrylate, vinyldimethylacetoxy silane, dimethylethoxy silane, dimethyldimethoxy silane, diphenyldiethoxy silane, hexamethyldisiloxane, 1,3-divinyltetramethyl disiloxane, 1,3-diphenyltetramethyl disiloxane, and dimethylpolysiloxane including 2 to 12 siloxane units in its molecule and having a hydroxyl group bound to Si per one unit located at the end. One of them or a mixture of two or more of them may be used.

The silazane compound is a generic name of a compound having an Si—N bond in its molecule. Specific examples thereof include dimethyl disilazane, trimethyl disilazane, tetramethyl disilazane, pentamethyl disilazane, hexamethyl disilazane, octamethyl trisilazane, hexamethylcyclo trisilazane, tetraethyltetramethylcyclo tetrasilazane, tetraphenyldimethyl disilazane, dipropyltetramethyl disilazane, dibutyltetramethyl disilazane, dihexyltetramethyl disilazane, dioctyltetramethyl disilazane, diphenyl tetramethyl disilazane, and octamethylcyclo tetrasilazane. In addition, a fluorine-containing organic silazane compound obtained by substituting a silazane compound partially with fluorine may be used. In particular, in the present invention, hexamethyldisilazane is preferably used.

In addition, when the hydrophobic inorganic fine particles are applied to a positively chargeable toner, the following treatment agents are used.

As the silicone oil, one may be cited having a nitrogen atom in its side chain. Such silicone oil includes one having a unit(s) represented by the following formula (1) and/or the following formula (2).

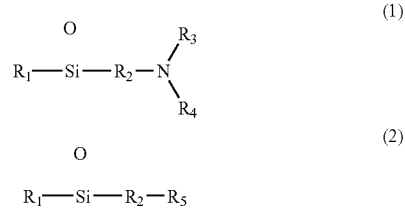

[In the formulae, $R_1$ represents a hydrogen atom, an alkyl group, an aryl group or an alkoxy group, $R_2$ represents an alkylene group or a phenylene group, $R_3$ and $R_4$ each represent a hydrogen atom, an alkyl group or an aryl group, and $R_5$ represents a nitrogen-containing heterocyclic group.]

It should be noted that the above alkyl group, aryl group, alkylene group or phenylene group may have an organo group having a nitrogen atom, or may have a substituent such as a halogen atom.

As a silane compound, nitrogen-containing silane compounds are exemplified.

Specific examples thereof include aminopropyltrimethoxy silane, aminopropyltriethoxy silane, dimethylaminopropyltrimethoxy silane, diethylaminopropyltrimethoxy silane, dipropylaminopropyltrimethoxy silane, dibutylaminopropyltrimethoxy silane, monobutylaminopropyltrimethoxy silane, dioctylaminopropyltrimethoxy silane, dibutylaminopropyldimethoxy silane, dibutylaminopropylmonomethoxy silane, dimethylaminophenyltrimethoxy silane, trimethoxysilyl-γ-propyphenyl amine, trimethoxysilyl-γ-propylbenzyl amine, trimethoxysilyl-γ-propyl piperizine, trimethoxysilyl-γ-propylmorpholine, and trimethoxysilyl-γ-propylimidazole. One of those treatment agents or a mixture of two or more of those treatment agents may be used. Alternatively, those treatment agents may be used in combination or in multiple-processing.

A known technique is employed in a method for a hydrophobic treatment for the surfaces of the inorganic fine particles with silicone oil. For example, untreated inorganic fine particles are placed in a treatment tank, and the inorganic fine particles and the silicone oil are mixed while the inside of the treatment tank is stirred by means of a stirring member such as a stirring blade. The inorganic fine particles and the silicone oil may be directly mixed with a mixer such as a Henschel mixer, or may be mixed by a method involving spraying the silicone oil onto the untreated inorganic fine particles. Alternatively, after the silicone oil is dissolved or dispersed in a proper solvent, the resultant is mixed with the untreated inorganic fine particles, and then the solvent is removed to thereby produce the hydrophobic inorganic fine particles.

The treatment is preferably performed under heating in order that the immobilization ratio of the silicone oil onto the surfaces of the inorganic fine particles may be increased. The treatment is desirably performed at a temperature in the range of preferably 150° C. or higher and 350° C. or lower, or more preferably 200° C. or higher and 300° C. or lower. When setting the treatment temperature within the range, it is easy for the size of a droplet of the silicone oil to be stabilized when the silicone oil is sprayed, and the immobilization ratio of the silicone oil onto the surfaces of the inorganic fine particles can be sufficiently increased in such a state that surface treatment is uniformly performed.

A known technique may be employed in a method for the treatment with the silane compound or silazane compound. For example, the inorganic fine particles treated with the silicone oil are placed in a treatment tank, and a predetermined amount to the silane compound or silazane compound is dropwise added or is brought into a cloud state and sufficiently mixed, while the inside of the treatment tank is stirred with a stirring member such as a stirring blade. In this case, the silane compound or silazane compound may be diluted with a solvent such as an alcohol before the treatment. The inorganic fine particles containing the treatment agent mixed and dispersed are heated to a treatment temperature of 150° C. or higher and 350° C. or lower (or preferably 150° C. or higher and 250° C. or lower) in a nitrogen atmosphere, and are then refluxed for 0.5 to 5 hours while being stirred.

A preferable production method for the hydrophobic inorganic fine particles is as described below. The inorganic fine particles treated with the silicone oil are placed in a treatment tank, and the temperature in the treatment tank is kept at a temperature in the range of the boiling point of the silane compound or silazane compound used in the treatment or higher to the decomposition temperature of the compound or lower. Water vapor is blown into the treatment tank so that a state can be created in which hydroxyl groups on the surfaces of the inorganic fine particles are easily react with the silane compound or silazane compound. Further, the silane compound or silazane compound is placed, and the surfaces of the inorganic fine particles are treated by a vapor phase reaction. After that, excessive substances such as an excessive treatment agent may be removed as required.

The treatment with the silane compound or silazane compound can be performed in tandem with the first silicone oil treatment. However, the treatment with the silane compound or silazane compound is more preferably performed after the silicone oil treatment from the viewpoint of increasing the immobilization ratio of the silicone oil onto the surfaces of the inorganic fine particles so that the hydrophobicity degree of the inorganic fine particles can be additionally increased.

The second silicone oil treatment after the treatment with the silane compound or silazane compound can be performed in the same manner as in the first silicone oil treatment. In this regard, attention should be paid so that the treatment is performed at a treatment temperature in a range in which hydrophobic groups introduced to the surfaces of the inorganic fine particles by the treatment with the silane compound or silazane compound are not decomposed. The silicone oil treatment is preferably performed at a treatment temperature of 200° C. or higher and 300° C. or lower.

Of the inorganic fine particles subjected to such hydrophobic treatment, inorganic fine particles having the following wettability with respect to a mixed solvent of methanol and water are preferably used: a methanol concentration when a transmittance of light having a wavelength of 780 nm is 80% is 75 vol % or more (or more preferably 80 vol % or more). The methanol wettability represents the hydrophobicity degree of the hydrophobic inorganic fine particles, and the higher the methanol concentration, the higher the hydrophobicity of the hydrophobic inorganic fine particles. When the methanol wettability is less than 75%, the inorganic fine particles are apt to absorb moisture. Accordingly, in the case where a toner containing the hydrophobic inorganic fine particles is stored in a high-temperature, high-humidity environment over a long time period, the charge quantity and flowability of the toner are reduced, and hence the contamination of the inside of an image-forming apparatus due to the dripping of the toner or black spots may occur in some cases.

Further, inorganic fine particles having the following wettability are more preferably used: a methanol concentration when a transmittance of light having a wavelength of 780 nm is 90% is 75 vol % or more (or still more preferably 80 vol % or more). That the methanol concentration when the transmittance is 90% is 75 vol % or more means that the amount of inorganic fine particles having such a low hydrophobicity degree as to wet in a low methanol concentration is extremely small, and hence indicates that the hydrophobic treatment is uniformly performed. Accordingly, even when the toner is used in a high-temperature, high-humidity environment over a long time period after having been stored in a high-temperature, high-humidity environment over a long time period, reduction in charge quantity due to deterioration in the toner can be more preferably suppressed, and hence the quality of an image formed by using the toner can be favorably inhibited from deteriorating.

The hydrophobic inorganic fine particles of the present invention are applicable to any toners such as a color toner, a monochromatic toner, a magnetic toner, a non-magnetic toner, a pulverized toner and a chemical toner.

With regard to a developing method, the hydrophobic inorganic fine particles exert an effect in any developing method such as a one-component developing mode, a two-component developing method, a contact developing method and a non-contact developing method.

Of those, the hydrophobic inorganic fine particles of the present invention are particularly preferably applied to an image-forming apparatus including: a cleaning apparatus composed of a cleaning blade coming into contact with the surface of the photosensitive member to scrape off toner remaining on a photosensitive member, a scooping sheet positioned under the cleaning blade and coming into contact with the surface of the photosensitive member to scoop the scraped toner, and a waste toner reservoir for reserving the scraped waste toner; and a contact charging member coming into contact with the photosensitive member to charge the surface of the photosensitive member. Further, the hydrophobic inorganic fine particles exert a particularly excellent effect when the hydrophobic inorganic fine particles are added to a toner used in an image-forming method in which a process speed is 350 mm/sec or more.

The scooping sheet is placed so as to come into contact with the surface of the photosensitive member lest the toner scraped off with the cleaning blade should spill out of a cleaning container. However, the contact causes such a problem that the toner remaining on the surface of the photosensitive member is scraped off in some cases. The toner scraped off by the scooping sheet does not enter the cleaning container, so the toner scatters in an image-forming apparatus to contaminate the main body of the apparatus or drops onto a transfer material such as paper to be responsible for black spots.

In particular, the toner stored in a high-temperature, high-humidity environment over a long time period is reduced in charging performance and flowability, so the charge quantity of the toner remaining on the surface of the photosensitive member is also low. In addition, since the particles of the toner are aggregated, the toner comes to be easily scraped off from the surface of the photosensitive member. The phenomenon tends to be more remarkable as the process speed increases.

On the other hand, the toner stored in a high-temperature, high-humidity environment over a long time period shows is reduced in charging performance and flowability, so fogging is apt to increase when the toner is used in a low-temperature, low-humidity environment. Although cleaning is typically performed by scraping off fogging toner with a cleaning blade, the toner is liable to escape without being scraped off with the cleaning blade as the process speed increases, and to adhere to a contact charging member to cause defective charging.

The hydrophobic inorganic fine particles of the present invention do not reduce the charging performance and flowability of the toner even when being left standing in a high-temperature, high-humidity environment over a long time period. As a result, it is difficult for the toner to be scraped off by the scooping sheet to drip, or to escape from the cleaning blade to cause defective charging. Accordingly, the hydrophobic inorganic fine particles are particularly preferably used in the image-forming apparatus.

The toner of the present invention includes at least: toner particles containing at least a binder resin and a colorant; and the hydrophobic inorganic fine particles. In this case, the toner preferably contains the hydrophobic inorganic fine particles in an amount of 0.1 part by mass or more and 5.0 parts by mass or less with respect to 100 parts by mass of the toner particles. The flowability and charging performance of the toner are further improved when the content of the hydrophobic inorganic fine particles falls within the above range.

Examples of types of binder resins to be used for the toner particles include a styrene-type resin, a styrene-type copolymer resin, a polyester resin, a polyol resin, a polyvinyl chloride resin, a phenolic resin, a natural denatured phenolic resin, a natural resin denatured maleic resin, an acrylic resin, a methacrylic resin, polyvinyl acetate, a silicone resin, a polyurethane resin, a polyamide resin, a furan resin, an epoxy resin, a xylene resin, a polyvinyl butyral, a terpene resin, a coumarone-indene resin, and a petroleum-type resin. The polyester resin and the styrene-type copolymer resin are preferably used which are small in variation of charging performance due to environment and superior in fixing performance.

Examples of a comonomer for a styrene monomer of a styrene-type copolymer include: styrene derivatives such as vinyltoluene; acrylic acid; acrylates such as methyl acrylate, ethyl acrylate, butyl acrylate, dodecyl acrylate, octyl acrylate, 2-ethylhexyl acrylate, and phenyl acrylate; methacrylic acid; methacrylates such as methyl methacrylate, ethyl methacrylate, butyl methacrylate, and octyl methacrylate; maleic acid; dicarboxylates having a double bond such as butyl maleate, methyl maleate, and dimethyl maleate; acrylamide; acrylonitrile; methacrylonitrile; butadiene; vinyl chloride; vinyl esters such as vinyl acetate and vinyl benzoate; ethylene-type olefins such as ethylene, propylene, and butylene; vinyl ketones such as vinyl methyl ketone and vinyl hexyl ketone; and vinyl ethers such as vinyl methyl ether, vinyl ethyl ether, and vinyl isobutyl ether. These vinyl-type monomers may be used each singly or in combination.

The binder resin may have an acid value. Examples of a monomer controlling the acid value of the binder resin include: acrylic acid such as acrylic acid, methacrylic acid, α-ethyl acrylate, crotonic acid, cinnamic acid, vinyl acetate, isocrotonic acid, or angelic acid and an α- or β-alkyl derivative thereof; and an unsaturated dicarboxylic acid such as fumalic acid, maleic acid, citraconic acid, alkenyl succinic acid, itaconic acid, mesaconic acid, dimethyl maleic acid, or dimethyl fumaric acid and a monoester derivative or anhydride thereof. A desired polymer can be produced by copolymerizing any one of the monomers or a mixture of the monomers with another monomer. Of those, a monoester derivative of an unsaturated dicarboxylic acid is particularly preferably used to control the acid value.

More specific examples include: monoesters of α- or β-unsaturated dicarboxylic acid such as monomethyl maleate, monoethyl maleate, monobutyl maleate, monooctyl maleate, monoallyl maleate, monophenyl maleate, monomethyl fumarate, monoethyl fumarate, monobutyl fumarate, and monophenyl fumarate; and monoesters of alkenyl dicarboxylic acid such as monobutyl n-butenylsuccinate, monomethyl n-octenylsuccinate, monoethyl n-butenylmalonate, monomethyl n-dodecenylglutarate, and monobutyl n-butenyladipate.

The carboxyl group-containing monomer as described above may be added at 0.1 to 20 parts by mass, or preferably 0.2 to 15 parts by mass with respect to 100 parts by mass of the total monomers constituting the binder resin.

The binder resin has a glass transition temperature (Tg) of preferably 45 to 80° C., or more preferably 50 to 70° C. from the viewpoint of storage stability. When the Tg is lower than 45° C., the low Tg is responsible for the deterioration of the toner under a high-temperature atmosphere or for offset at the time of fixation. In addition, when the Tg exceeds 80° C., the fixing performance of the toner tends to be lowered.

A polymerization method that may be employed as a method of synthesizing the binder resin is, for example, a solution polymerization method, an emulsion polymerization method, or a suspension polymerization method.

Of those, the emulsion polymerization method is a method involving: dispersing a monomer which is nearly insoluble in water into small particles in an aqueous phase with an emulsifier; and subjecting the resultant to polymerization with a water-soluble polymerization initiator. In this method, reaction heat is easily adjusted, and a phase in which the polymerization is performed (an oil phase formed from a polymer and the monomer) and the aqueous phase are separated from each other, so the termination reaction rate is low. As a result, the polymerization rate is high, and hence a polymer having a high polymerization degree can be obtained. Further, the method is advantageous to production of a hydrophobic binder resin for the reasons that a polymerization process is relatively simple, and the polymerization product is in the shape of fine particles and can be easily mixed with a colorant, a charge control agent and any other additive in toner production. However, the produced polymer is apt to be impure owing to the emulsifier added, and an operation such as salting out is required for taking out the polymer. Suspension polymerization is available for avoiding such inconvenience.

In the suspension polymerization, it is preferable to use 100 parts by mass or less (preferably 10 to 90 parts by mass) of a monomer with respect to 100 parts by mass of an aqueous solvent. Examples of usable dispersants include polyvinyl alcohol, a partially saponified product of polyvinyl alcohol, and calcium phosphate. In general, such dispersants each are used in an amount of 0.05 to 1 part by mass with respect to 100 parts by mass of an aqueous solvent. A polymerization temperature, which is appropriately 50 to 95° C., is appropriately selected depending on a polymerization initiator to be used and an objective polymer.

As the polymerization initiator to be used in synthesizing a binder resin, polyfunctional polymerization initiators exemplified below may each be used singly or may each be used with a monfunctional polymerization initiator.

Specific examples of the polyfunctional polymerization initiator having a polyfunctional structure include ones selected from: polyfunctional polymerization initiators containing in one molecule two or more functional groups each having a polymerization initiating function such as a peroxide group (for example, 1,1-di-t-butylperoxy-3,3,5-trimethylcyclohexane, 1,3-bis-(t-butylperoxyisopropyl)benzene, 2,5-dimethyl-2,5-(t-butylperoxy)hexane, 2,5-dimethyl-2,5-di-(t-butylperoxy)hexane, tris-(t-butylperoxy)triazine, 1,1-di-t-butylperoxycyclohexane, 2,2-di-t-butylperoxybutane, 4,4-di-t-butylperoxyvaleric acid-n-butylester, di-t-butylperoxyhexahydroterephthalate, di-t-butylperoxy azelate, di-t-butylperoxytrimethyladipate, 2,2-bis-(4,4-di-t-butylperoxycyclohexyl)propane, 2,2-t-butylperoxyoctane, and various polymer oxides); and polyfunctional polymerization initiators containing in one molecule both a functional groups having a polymerization initiating function such as a peroxide group and a polymerizable unsaturated group (for example, diallylperoxy dicarbonate, t-butylperoxy maleic acid, t-butylperoxyallyl carbonate, and t-butylperoxyisopropyl fumarate).

Of those, the following is more preferable: 1,1-di-t-butylperoxy-3,3,5-trimethylcyclohexane, 1,1-di-t-butylperoxycyclohexane, di-t-butylperoxyhexahydroterephthalate, di-t-butylperoxy azelate, 2,2-bis-(4,4-di-t-butylperoxycyclohexyl)propane, and t-butylperoxyallyl carbonate.

Such polyfunctional polymerization initiators are each used preferably in combination with a monofunctional polymerization initiator in order to satisfy various performances required as a hydrophobic binder. In particular, the polyfunctional polymerization initiator is preferably used in combination with a monofunctional polymerization initiator whose 10-hour half-life temperature (a decomposition temperature at which the half-life is 10 hours) is lower than that of the polyfunctional polymerization initiator.

Specific examples of the monofunctional polymerization initiator include: organic peroxides such as benzoyl peroxide, 1,1-di(t-butylperoxy)-3,3,5-trimethylcyclohexane, n-butyl-4,4-di(t-butylperoxy)valerate, dicumyl peroxide, α,α'-bis(t-butylperoxydiisopropyl)benzene, t-butylperoxycumene, and di-t-butyl peroxide; and azo and diazo compounds such as azobisisobutyronitrile and diazoaminoazobenzene.

Each of those monofunctional polymerization initiators may be added to a monomer simultaneously with addition of the polyfunctional polymerization initiator. However, in order to keep the efficiency of the polyfunctional polymerization initiator optimal, the monofunctional polymerization initiator is preferably added after the half-life of the polyfunctional polymerization initiator has passed in the polymerization step.

The polymerization initiator is preferably used in an amount of 0.05 to 2 parts by mass with respect to 100 parts by mass of a monomer in terms of efficiency.

The binder resin is preferably cross-linked by a cross-linkable monomer.

As the cross-linkable monomer, a monomer having mainly two or more polymerizable double bonds may be used. Specific examples thereof include aromatic divinyl compounds (for example, divinyl benzene or divinyl naphthalene); diacrylate compounds each bonded with an alkyl chain (for example, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds in which acrylate in each of the above compounds is replaced with methacrylate); diacrylate compounds each bonded with an alkyl chain including an ether bond (for example, diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds in which acrylate in the above compounds is replaced with methacrylate); diacrylate compounds each bonded with a chain including an aromatic group and an ether bond (for example, polyoxyethylene (2)-2,2-bis(4-hydroxyphenyl)propane diacrylate, polyoxyethylene(4)-2,2-bis(4-hydroxyphenyl)propane diacrylate, and compounds in which acrylate in each of the above compounds is replaced with methacrylate); and polyester diacrylate compounds (for example, MANDA (trade name; Nippon Kayaku Co., Ltd.)). Examples of a polyfunctional cross-linking agent include: pentaerythritol acrylate, trimethylolethane triacrylate, trimethylolpropane triacrylate, tetramethylolpropane triacrylate, tetramethylolmethane tetraacrylate, oligoester acrylate, and compounds in which acrylate in the above compounds is replaced with methacrylate; and triallyl cyanurate and triallyl trimellitate.

Such cross-linking agents is each used in the range of preferably 0.00001 to 1 part by mass, or more preferably 0.001 to 0.05 part by mass with respect to 100 parts by mass of other monomer components.

Of those cross-linkable monomers, aromatic divinyl compounds (especially divinylbenzene), diacrylate compounds each bound to a chain including an aromatic group and an ether bond are preferably used in terms of the fixability and offset resistance of toner.

Other available methods of synthesizing the binder resin can include a bulk polymerization method and a solution polymerization method. In the bulk polymerization method, a low-molecular-weight polymer can be provided by carrying out polymerization at a high temperature to increase the termination reaction rate, but a problem is raised in that a reaction is difficult to control. In contrast, the solution polymerization method is preferable because a desired low-molecular-weight polymer can be easily obtained under moderate conditions by adjusting the amount of an initiator and a reaction temperature or by utilizing the difference in chain transfer between radicals according to a solvent. In particular, a solution polymerization method under a pressurized condition is also preferable because the amount of an initiator to be used can be minimized and an influence of a remaining initiator can be controlled to be minimum.

Further, when a polyester resin is used as the binder resin, the following acid components and alcohol components may be used.

Examples of a dihydric alcohol component include: ethylene glycol; propylene glycol; 1,3-butanediol; 1,4-butanediol; 2,3-butanediol; diethylene glycol; triethylene glycol; 1,5-pentanediol; 1,6-hexanediol; neopentyl glycol; 2-ethyl-1,3-hexanediol; hydrogenated bisphenol A; and a bisphenol represented by a formula (A) and a derivative thereof; and diols each represented by a formula (B).

(A)

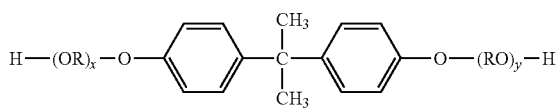

(In the formula, R represents an ethylene or propylene group, x and y each independently represent an integer of 0 or more, and the average of x+y is 0 to 10.)

(B)

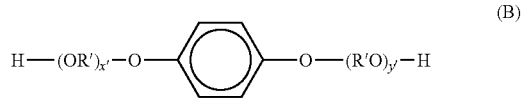

(In the formula, R' represents

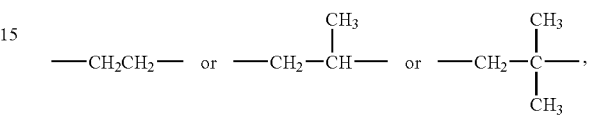

X' and Y' each represent an integer of 0 or more, and the average of X'+Y' is 0 to 10.)

Examples of a divalent acid component include dicarboxylic acids and derivatives thereof such as: benzene dicarboxylic acids such as phthalic acid, terephthalic acid, isophthalic acid, and phthalic anhydride, or anhydrides or lower alkyl esters thereof; alkyldicarboxylic acids such as succinic acid, adipic acid, sebacic acid, and azelaic acid, or anhydrides or lower alkyl esters thereof; alkenylsuccinic acids or alkylsuccinic acids such as n-dodecenylsuccinic acid and n-dodecylsuccinic acid, or anhydrides or lower alkyl esters thereof; and unsaturated dicarboxylic acids such as fumaric acid, maleic acid, citraconic acid, and itaconic acid, or anhydrides or lower alkyl esters thereof.

In addition, an alcohol component which is trihydric or more and an acid component which is tricarboxylic or more, which serve as cross-linking components, are preferably used.

Examples of a polyhydric alcohol component which is trihydric or more include: sorbitol; 1,2,3,6-hexanetetrol; 1,4-sorbitan; pentaerythritol; dipentaerythritol; tripentaerythritol; 1,2,4-butanetriol; 1,2,5-pentanetriol; glycerol; 2-methyl propanetriol; 2-methyl-1,2,4-butanetriol; trimethylolethane; trimethylolpropane; and 1,3,5-trihydroxybenzene. Examples of a polycarboxylic acid component which is tricarboxylic or more in the present invention include polyvalent carboxylic acids and derivatives thereof such as: trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, and an enpol trimer acid, and anhydrides and lower alkyl esters thereof; and tetracarboxylic acids each represented by the following formula and anhydrides and lower alkyl esters thereof.

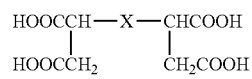

(In the formula, X represents an alkylene or alkenylene group having 5 to 30 carbon atoms and having one or two or more sides chains each having 3 or more carbon atoms)

The amount of an alcohol component in all the components to be used in synthesizing a polyester resin is preferably 40 to 60 mol % and more preferably 45 to 55 mol %. The amount of an acid component is preferably 60 to 40 mol % and more preferably 55 to 45 mol %. In addition, a polyvalent component which is trivalent or more preferably accounts for 5 to 60 mol % of all the components.

The polyester resin is obtained by generally known condensation polymerization.

The toner of the present invention may include also wax.

Examples of waxes which may be used include the following: aliphatic hydrocarbon-based waxes such as low-molecular-weight polyethylene, low-molecular-weight polypropylene, a polyolefin copolymer, polyolefin wax, microcrystalline wax, paraffin wax, and Fischer-Tropsch wax; oxides of aliphatic hydrocarbon wax such as polyethylene oxide wax; or block copolymers of the wax; vegetable wax such as candelila wax, carnauba wax, haze wax, and jojoba wax; animal wax such as bees wax, lanolin, and spermaceti wax; mineral wax such as ozokerite, ceresin, and petrolatum; wax mainly composed of fatty acid esters such as montanic acid ester wax and castor wax; and partially or wholly deacidified fatty acid esters such as deacidified carnauba wax. The examples further include: saturated straight-chain aliphatic acids such as palmitic acid, stearic acid, montanic acid, and long-chain alkylcarboxylic acid having a longer alkyl group; unsaturated fatty acids such as brassidic acid, eleostearic acid, and parinaric acid; saturated alcohols such as stearyl alcohol, eicosyl alcohol, behenyl alcohol, carnaubyl alcohol, ceryl alcohol, melissyl alcohol, and alkyl alcohol having a longer alkyl group; polyhydric alcohols such as sorbitol; fatty amides such as linoleic amide, oleic amide, and lauric amide; saturated fatty bis amides such as methylene bis stearamide, ethylene bis capramide, ethylene bis lauramide, and hexamethylene bis stearamide; unsaturated fatty amides such as ethylene bis oleamide, hexamethylene bis oleamide, N,N'-dioleyl adipamide, and N,N'-dioleyl sebacamide; aromatic bis amides such as m-xylene bis stearamide and N—N'-distearyl isophthalamide; aliphatic metal salts (which are generally referred to as metal soap) such as calcium stearate, calcium laurate, zinc stearate, and magnesium stearate; wax obtained by grafting aliphatic hydrocarbon wax with vinyl-type monomers such as styrene and acrylic acid; partially esterified products of fatty acids and polyhydric alcohols such as behenic monoglyceride; and methyl ester compounds each having a hydroxyl group obtained by hydrogenation of vegetable oil.

In addition, the following is preferably used: wax whose molecular weight distribution is sharpened by a press sweating method, a solvent method, a recrystallization method, a vacuum distillation method, a supercritical gas extraction method, or a melt crystallization method, or wax in which low-molecular-weight solid fatty acids, low-molecular-weight solid alcohols, low-molecular-weight solid compounds or other impurities are removed.

Specific examples of wax which may be used as release agents include the following: Biscol (trademark) 330-P, 550-P, 660-P, and TS-200 (Sanyo Chemical Industries, Ltd.); Hiwax 400P, 200P, 100P, 410P, 420P, 320P, 220P, 210P, and 110P (Mitsui Chemicals, Inc.); Sasol H1, H2, C80, C105, and C77 (Schumann Sasol); HNP-1, HNP-3, HNP-9, HNP-10, HNP-11, and HNP-12 (NIPPON SEIRO CO., LTD.); Unilin (trademark) 350, 425, 550, and 700 and Unisid (trademark) 350, 425, 550, and 700 (TOYO-PETROLITE); and haze wax, beeswax, rice wax, candelilla wax, and carnauba wax (available from CERARICA NODA Co., Ltd.).

The toner of the present invention can be used also as a magnetic toner by further incorporating a magnetic materia. In this case, the magnetic material can also function as a colorant.

Examples of the magnetic material in the magnetic toner include: iron oxides such as magnetite, maghemite and ferrite; and metals such as iron, cobalt and nickel, and alloys and mixtures of these metals with metals such as aluminum, cobalt, copper, lead, magnesium, tin, zinc, antimony, beryllium, bismuth, cadmium, calcium, manganese, selenium, titanium, tungsten and vanadium.

Such a magnetic material has an average particle diameter of preferably 2 μm or less, or more preferably 0.05 to 0.5 μm. The magnetic material is incorporated into the toner in an amount of preferably about 20 to 200 parts by mass, or more preferably 40 to 150 parts by mass, with respect to 100 parts by mass of the binder resin.

As a black colorant, carbon black, grafted carbon as a black colorant or a substance adjusted to black by using the following yellow/magenta/cyan colorants may be used.

Examples of the compound which may be used as a yellow colorant include compounds typified by: condensed azo compounds; an isoindoline compound; an anthraquinone compound; an azo metal complex; a methine compound; and an allyl amide compound.

Examples of the compound which may be used as a magenta colorant include: condensed azo compounds; a diketopyrrolopyrrol compound; anthraquinone; a quinacridone compound; a base dyed lake compound; a naphtol compound; a benzimidazolon compound; a thioindigo compound; and a perylene compound.

Examples of the compound which may be used as a cyan colorant include: copper phthalocyanine compounds and derivatives thereof; an anthraquinone compound; and a basic dye lake compound. The colorants may be used each singly or in a mixture or in a solid solution state.

The colorants are selected from the viewpoints of hue angle, chroma saturation, brightness, weatherability, OHP transparency, and dispersibility in toner. The amount of each of the colorants to be used is 1 to 20 parts by mass with respect to 100 parts by mass of the binder resin.

A charge control agent is preferably incorporated into the toner. Any one of the following substances is available as an agent for controlling the toner to be negatively chargeable.

For example, organometallic compounds and chelate compounds are effective, and examples of the compounds include a monoazo metal compound, an acetylacetone metal compound, an aromatic hydroxycarboxylic acid metal compound, and an aromatic dicarboxylic acid metal compound. In addition, for example, aromatic hydroxycarboxylic acids and aromatic monocarboxylic or polycarboxylic acids, and the metal salts, anhydrides and esters of the acids, and phenol derivatives such as bisphenol may also be used.

In addition, an azo metal compound represented by the following formula (1) is preferable.

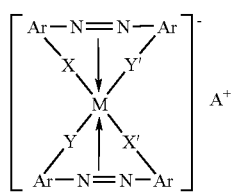
(1)

[In the formula, M represents a center metal, and specific examples of the center metal include Sc, Ti, V, Cr, Co, Ni, Mn and Fe, Ar represents an arylene group such as a phenylene group or a naphthylene group, and the arylene group may have a substituent such as a nitro group, a halogen group, a carboxyl group, an anilide group, an alkyl group having 1 to 18 carbon atoms or an alkoxy group, X, X', Y and Y' each independently represent —O—, —CO—, —NH—, or —NR— (where R represents an alkyl group having 1 to 4 carbon atoms), and A+ represents a counter ion, specifically a hydrogen ion, a sodium ion, a potassium ion, an ammonium ion or an aliphatic ammonium ion.]

In particular, the center metal in the above formula (1) is preferably Fe or Cr. In addition, the substituent of the arylene group in the above formula (1) is preferably a halogen atom, an alkyl group or an anilide group. The counter ion in the above formula (1) is preferably a hydrogen ion, an alkali metal ion, an ammonium ion or an aliphatic ammonium ion. A mixture of azo metal compounds having different counter ions is also preferably used.

Alternatively, a basic, organic acid metal compound represented by the following formula (2) may also be used in the present invention because the compound imparts negative charging performance to the toner.

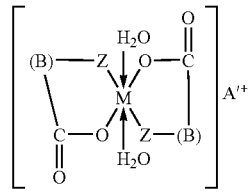

[In the formula, M represents a coordination center metal such as Cr, Co, Ni, Mn, Fe, Zn, Al, B or Zr, B represents

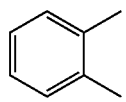

(which may have a substituent such as an alkyl group),

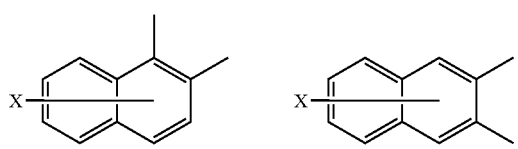

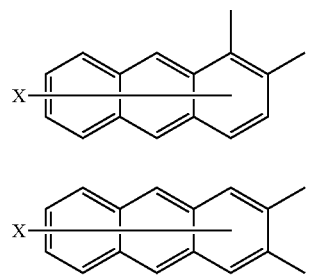

(where X represents a hydrogen atom, a halogen atom, a nitro group or an alkyl group), or

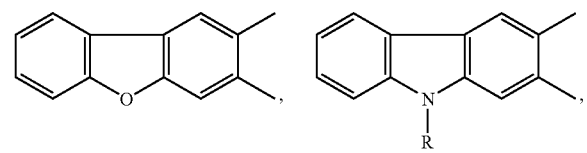

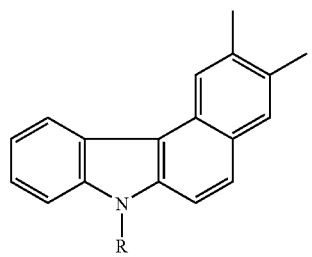

(where R represents a hydrogen atom, an alkyl group having 1 to 18 carbon atoms or an alkenyl group having 2 to 18 carbon atoms), $A'^+$ represents, for example, a hydrogen, sodium, potassium, ammonium or aliphatic ammonium ion, or is absent, and Z represents —O— or

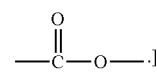

.]

In particular, the center metal in the above formula (2) is preferably Fe, Cr, Si, Zn, Zr or Al. In addition, the substituent of the arylene group in the above formula (2) is preferably an alkyl group, an anilide group, an aryl group or a halogen atom. In addition, the counter ion in the above formula (2) is preferably a hydrogen ion, an ammonium ion or an aliphatic ammonium ion.

Of those, an azo metal compound represented by the formula (1) is more preferable, and in particular, an azo iron compound represented by the following formula (3) is most preferable.

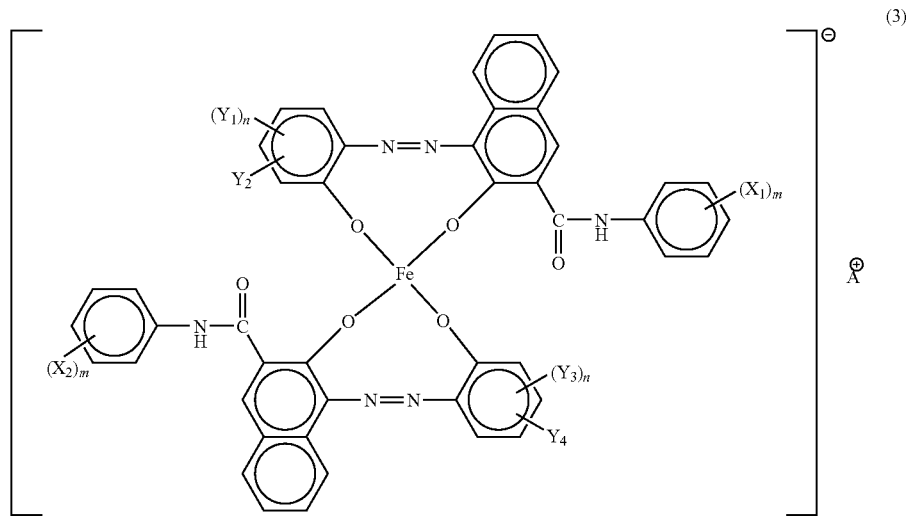

(3)

[$X_1$ and $X_2$ each represent a hydrogen atom, a lower alkyl group, a lower alkoxy group, a nitro group, or a halogen atom;

m and m' each represent an integer of 1 to 3;

$Y_1$ and $Y_3$ each represent a hydrogen atom, an alkyl group having 1 to 18 carbon atoms, an alkenyl group having 2 to 18 carbon atoms, a sulfonamide group, a mesyl group, a sulfonic group, a carboxy ester group, a hydroxy group, an alkoxy group having 1 to 18 carbon atoms, an acetylamino group, a benzoyl group, an amino group, or a halogen atom;

n and n' each represent an integer of 1 to 3;

$Y_2$ and $Y_4$ each represent a hydrogen atom or a nitro group ($X_1$ and $X_2$, m and m', $Y_1$ and $Y_3$, n and n', or $Y_2$ and $Y_4$ described above may be identical to or different from each other); and $A^\oplus$ represents an ammonium ion, an alkali metal ion, a hydrogen ion, or a mixed ion of two or more of them.]

Next, specific examples of the compound will be shown.

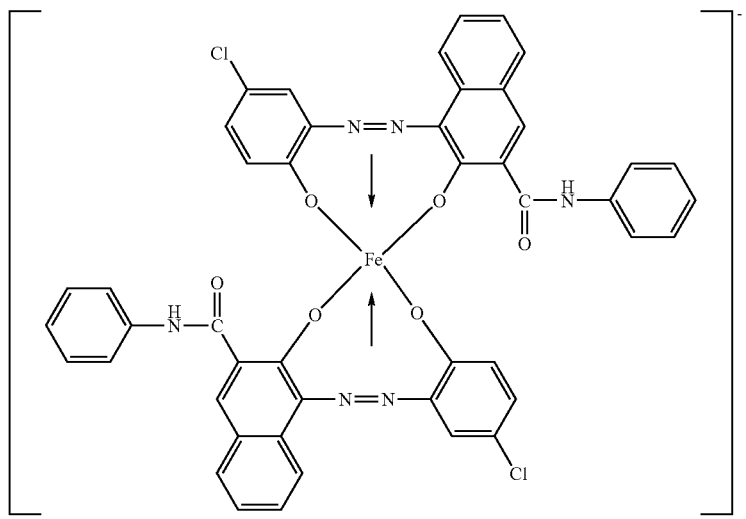

Azo-based iron compound (1)

NH4+ (and H+, Na+, K+, or a mixed ion of two or more of them)

-continued
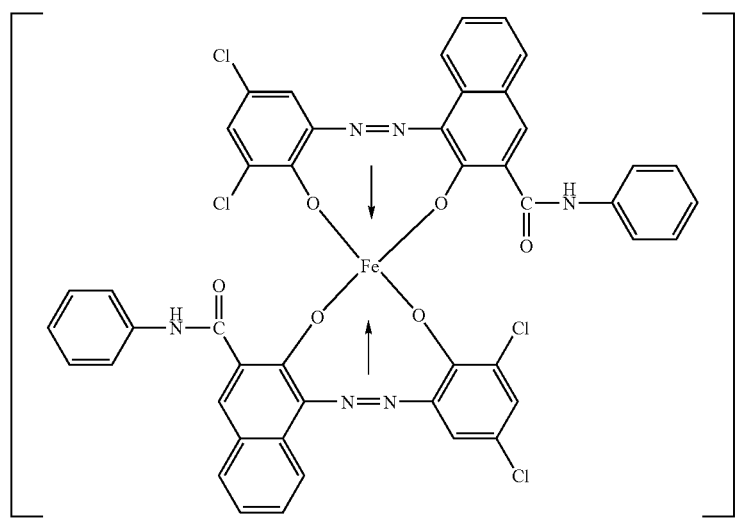
Azo-based iron compound (2)
NH4+ (and H+, Na+, K+, or a mixed ion of two or more of them)
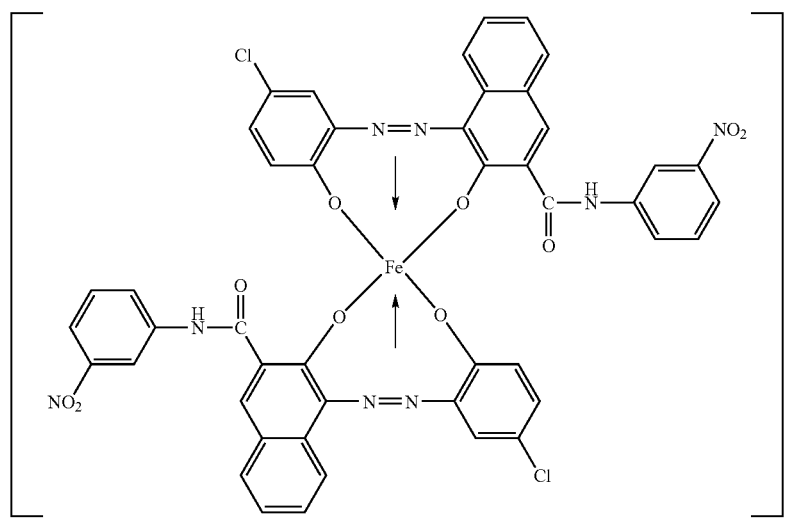
Azo-based iron compound (3)
NH4+ (and H+, Na+, K+, or a mixed ion of two or more of them)
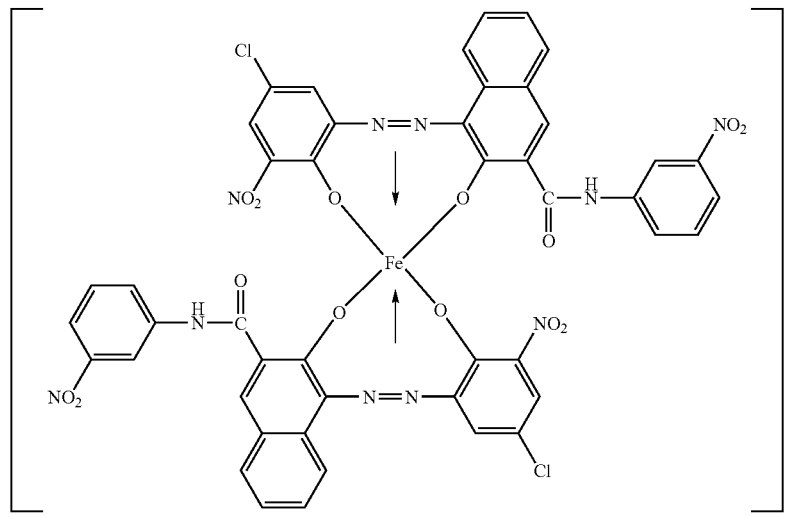
Azo-based iron compound (4)
NH4+ (and H+, Na+, K+, or a mixed ion of two or more of them)

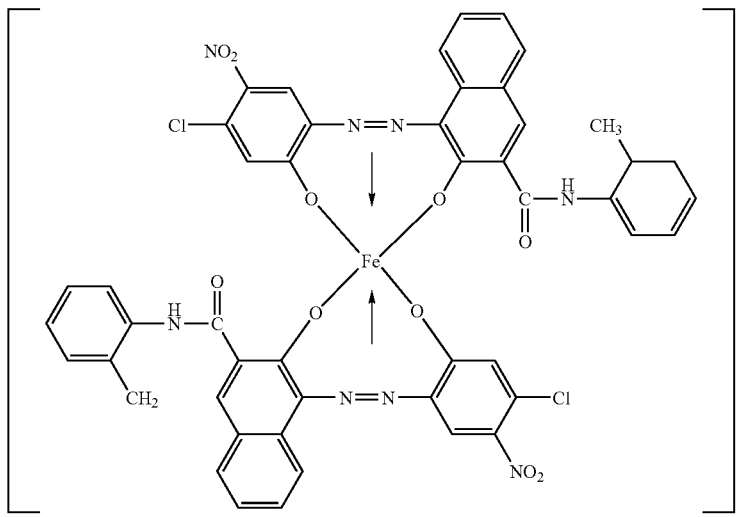

Azo-based iron compound (5)

NH4+ (and H+, Na+, K+, or a mixed ion of two or more of them)

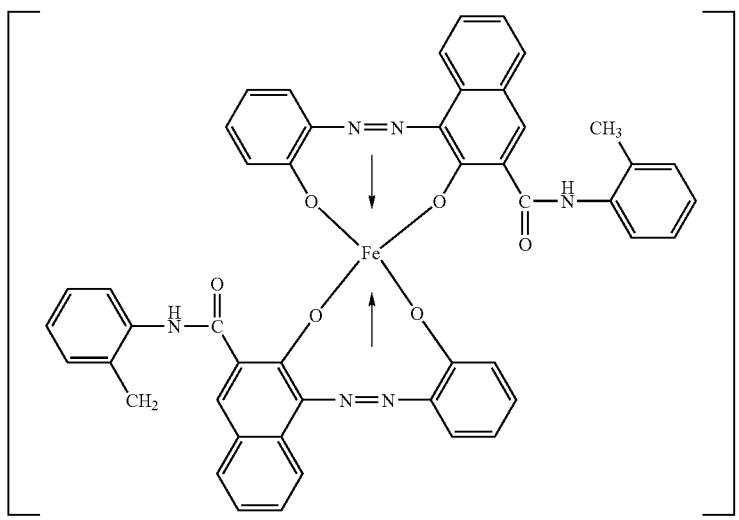

Azo-based iron compound (6)

NH4+ (and H+, Na+, K+, or a mixed ion of two or more of them)

Examples of a positive charge control agent include the following substances: nigrosine and products modified with fatty acid metal salts; tributylbenzylammonium-1-hydroxy-4-naphthosulfonic acid salts; quaternary ammonium salts such as tetrabutylammonium tetrafluoroborate; onium salts such as phosphonium salts and lake pigments thereof; triphenylmethane dyes and lake pigments thereof (laking agents include phosphotungstic acid, phosphomolybdic acid, phosphotungsomolybdic acid, tannic acid, lauric acid, gallic acid, ferricyanide, and ferrocyanide); metal salts of higher fatty acids; guanidine compounds; and imidazole compounds. These substances may be used each singly or in a combination of two or more of them. Of those, a triphenylmethane compound, or a quaternary ammonium salt the counter ion of which is not a halogen is preferably used.

In addition, a homopolymer of a monomer represented by the following general formula (4), or a copolymer of the monomer and the above-mentioned polymerizable monomer such as styrene, an acrylate or a methacrylate can be used as the positive charge control agent. In this case, such charge control agents serve also as (the entirety or part of) a binder resin.

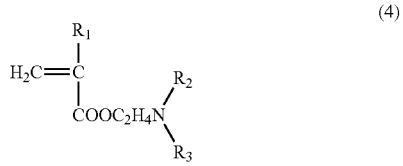

(4)

[In the formula, $R_1$ represents H or $CH_3$, and $R_2$ and $R_3$ each represent a substituted or unsubstituted alkyl group (having preferably 1 to 4 carbon atoms).]

A compound represented by the following general formula (5) is particularly preferably used as the positive charge control agent in the constitution of the present invention.

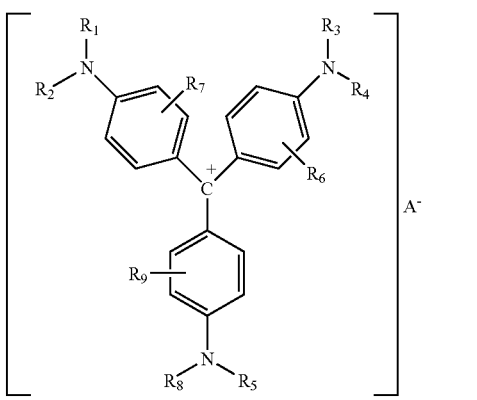

(5)

[In the formula, $R_1$, $R_2$, $R_3$, $R_4$, $R_5$, and $R_6$ may be identical to or different from one another, and each represent a hydrogen atom, a substituted or unsubstituted alkyl group, or a substituted or unsubstituted aryl group, $R_7$, $R_8$, and $R_9$ may be identical to or different from one another, and each represent a hydrogen atom, a halogen atom, an alkyl group, or an alkoxy group, and $A^-$ represents an anion selected from a sulfate ion, a nitrate ion, a borate ion, a phosphate ion, a hydroxide ion, an organic sulfate ion, an organic sulfonate ion, an organic phosphate ion, a carboxylate ion, an organic borate ion, and a tetrafluoroborate ion.]

Preferable examples of the charge control agent used for negative charging include the following: Spilon Black TRH, T-77, and T-95 (Hodogaya Chemical Co., Ltd.); and BONTRON (registered trademark) S-34, S-44, S-54, E-84, E-88, and E-89 (Orient Chemical Industries, LTD.). Preferable examples of the charge control agent used for positive charging include the following: TP-302 and TP-415 (Hodogaya Chemical Co., Ltd.); BONTRON (registered trademark) N-01, N-04, N-07, and P-51 (Orient Chemical Industries, LTD.); and Copy Blue PR (Clariant).

A method of incorporating the charge control agent into the toner includes a method involving adding the charge control agent to the inside of each toner particle and a method involving externally adding the charge control agent to toner particles. The amount of the charge control agent to be used is determined according to the type of binder resin, the presence or absence of any other additive, and a toner production method including a dispersing method, and hence, is not uniquely defined. The charge control agent is used in an amount ranging from preferably 0.1 to 10 parts by mass, or more preferably 0.1 to 5 parts by mass, with respect to 100 parts by mass of the binder resin.

The toner of the present invention can be used in combination with a carrier to serve as a two-component developer. A conventionally known carrier can be used as a carrier for use in the two-component development method. To be specific, particles are used which are made from, for example, a metal such as iron, nickel, cobalt, manganese, chromium, or a rare earth metal, or an alloy or oxide of the metal, with their surfaces being oxidized or unoxidized, and the particles have an average particle diameter of 20 to 300 μm.

In addition, carrier particles are preferably used in which a substance such as a styrene resin, an acrylic resin, a silicone resin, a fluorine resin or a polyester resin is adhered or applied to their surfaces.

Next, a method of producing the toner will be described. The toner can be produced by employing each of a pulverization toner production method and a polymerization toner production method.

In the case of producing toner particles by a pulverization method, a mixture containing at least the binder resin and colorant as described above may be used as materials. As required, a magnetic material, a wax, a charge control agent and any other additives are used. The toner can be produced by: mixing the materials sufficiently by means of a mixer such as a Henschel mixer or a ball mill; melting and kneading the mixture by means of a heat kneader such as a roll, a kneader, or an extruder so that the resins are compatible with each other; dispersing wax or a magnetic material therein; cooling the resultant for solidification; and pulverizing and classifying the solidified product.

In the case of producing toner by a pulverization method, a known production apparatus may be used, and for example, the following production apparatuses may be used.

As the toner production device, examples of a mixer include: Henschel mixer (manufactured by MITUI MINING. Co., Ltd.); Super Mixer (manufactured by KAWATA MFG Co., Ltd.); Ribocone (manufactured by OKAWARA CORPORATION); Nauta Mixer, Turburizer, and Cyclomix (manufactured by Hosokawa Micron); Spiral Pin Mixer (manufactured by Pacific Machinery & Engineering Co., Ltd.); and Loedige Mixer (manufactured by MATSUBO Corporation).

Examples of a kneader include: KRC kneader (manufactured by Kurimoto Ironworks Co., Ltd.); Buss Co-kneader (manufactured by Buss Co., Ltd.), TEM-type extruder (manufactured by TOSHIBA MACHINE Co., Ltd.); TEX Biaxial Kneader (manufactured by The Japan Steel Works, Ltd.); PCM Kneader (manufactured by Ikegai machinery Co.); Three-Roll Mill, Mixing Roll Mill, and Kneader (manufactured by Inoue Manufacturing Co., Ltd.); Kneadex (manufactured by Mitsui Mining Co., Ltd.); MS-type Pressure Kneader, and Kneader-Ruder (manufactured by Moriyama Manufacturing Co., Ltd.); and Banbury Mixer (manufactured by Kobe Steel, Ltd.).

Examples of the mill include: Counter Jet Mill, Micron Jet, and Inomizer (manufactured by Hosokawa Micron); IDS-type Mill and PJM Jet Mill (manufactured by Nippon Pneumatic MFG Co., Ltd.); Cross Jet Mill (manufactured by Kurimoto Tekkosho KK); Ulmax (manufactured by Nisso Engineering Co., Ltd.); SK Jet O-Mill (manufactured by Seishin Enterprise Co., Ltd.); Criptron (manufactured by Kawasaki Heavy Industries, Ltd.); Turbo Mill (manufactured by Turbo Kogyo Co., Ltd.); and Super Rotor (manufactured by Nisshin Engineering Inc.).

Examples of a classifier include: Classiel, Micron Classifier, and Spedic Classifier (manufactured by Seishin Enterprise Co., Ltd.); Turbo Classifier (manufactured by Nisshin Engineering Inc.); Micron Separator, Turboprex (ATP), and TSP Separator (manufactured by Hosokawa Micron); Elbow Jet (manufactured by Nittetsu Mining Co., Ltd.); Dispersion Separator (manufactured by Nippon Pneumatic MFG Co., Ltd.); and YM Microcut (manufactured by Yasukawa Shoji K.K.).

Examples of a sifter for sieving coarse particles include: Ultra Sonic (manufactured by Koei Sangyo Co., Ltd.); Rezona Sieve and Gyro Sifter (manufactured by Tokuju Corporation); Vibrasonic System (manufactured by Dalton Co., Ltd.); Sonicreen (manufactured by Shinto Kogyo K.K.); Turbo Screener (manufactured by Turbo Kogyo Co., Ltd.); Microsifter (manufactured by Makino mfg. co., Ltd.); and circular vibrating sieves.

Examples of a method of producing toner particles according to a polymerization method include the following: a method in which a molten mixture is sprayed into air by using a disc or a multi-fluid nozzle to produce spherical toner particles, as described in Japanese Patent Publication No. 56-13945; a method in which toner particles are directly produced by using a suspension polymerization method, as described in Japanese Patent Publication No. S36-10231, Japanese Patent Application Laid-Open No. H59-53856, and Japanese Patent Application Laid-Open No. H59-61842; a dispersion polymerization method in which particles are directly produced by using an aqueous organic solvent in which the monomer is soluble and the resulting polymer is insoluble; an emulsion polymerization method, typified by a soap-free polymerization method in which toner particles are produced by directly performing polymerization in the presence of a water-soluble polar polymerization initiator; and a hetero agglomeration method in which a primary polar emulsion polymerization particles are prepared in advance and then polar particles having opposite charge are added and associated to produce toner particles.

In the present invention, a suspension polymerization method by which fine toner particles with a sharp particle size distribution can be obtained relatively easily is particularly preferable. In the present invention, a so-called seed polymerization method can be advantageously used in which a monomer is allowed to adsorb on polymer particles obtained and then polymerized by using a polymerization initiator.

In the production of toner, when a direct polymerization method is used, toner can be produced by the following production method.

First, a low softening point substance, a colorant, a charge control agent, a polymerization initiator and other additives are added in a monomer and are uniformly dissolved or dispersed by means of a homogenizer, an ultrasonic dispersing device or the like to form a monomer system. Then, the monomer system is dispersed into an aqueous phase containing a dispersion stabilizer by using an ordinary mixer or a homomixer, a homogenizer or the like. Granulation of the resultant is performed by adjusting a stirring speed and/or time so that monomer droplets can have a desired toner particle size. Thereafter, the state of particles is maintained by the action of a dispersion stabilizer, and stirring has only to be performed to the extent that particles is prevented from sedimenting. Polymerization is performed after polymerization temperature is set to 40° C. or higher, normally 50 to 90° C. Further, the temperature may be increased in the latter half of the polymerization reaction. Further, to remove unreacted polymerizable monomers, by-products, etc. that are responsible for odor upon fixation of toner, part of the aqueous medium may be distilled off in the latter half of the reaction or after the reaction is completed. After completion of the reaction, the produced toner particles are collected by washing and filtration, and dried. In a suspension polymerization method, water is usually used as a dispersion medium in an amount of 300 to 3,000 parts by mass with respect to 100 parts by mass of the monomer system.

As vinyl-type polymerizable monomers capable of being polymerized by radical polymerization used at the time of producing toner by a polymerization method, a monofunctional polymerizable monomer or a polyfunctional polymerizable monomer may be used.

Examples of the monofunctional polymerizable monomer include: styrene; styrene-based polymerizable monomers such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, dibutyl phosphate ethyl acrylate, and 2-benzoyloxy ethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl benzoate, vinyl butyrate, vinyl benzoate, and vinyl formate; vinyl ethers such as vinyl methyl ether, vinyl ethyl ether, and vinyl isobutyl ether; and vinyl ketones such as vinyl methyl ketone, vinyl hexyl ketone, and vinyl isopropyl ketone.

Examples of the polyfunctional polymerizable monomer include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis[4-(acryloxy-diethoxy)phenyl]propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis[4-(methacryloxy-diethoxy)phenyl]propane, 2,2'-bis[4-(methacryloxy-polyethoxy)phenyl]propane, trimethylolpropane trimethacrylate, tetramethylolmethane tetramethacrylate, divinyl benzene, divinyl naphthalene, and divinyl ether.

The above monofunctional polymerizable monomers may be used each singly or in combination. In addition, each of the monofunctional polymerizable monomers and each of the polyfunctional polymerizable monomers may be used in combination. In addition, the polyfunctional polymerizable monomers may each be used as a crosslinking agent.

To form a core-shell structure in toner, a polar resin is preferably used together. Polar resins such as polar polymers and polar copolymers that can be used in the present invention are exemplified below.

Examples of the polar resin include polymers of a nitrogen-containing monomer such as dimethylaminoethyl methacrylate and diethylaminoethyl methacrylate, or copolymers of the nitrogen-containing monomers and styrene-unsaturated carboxylic esters; nitrile monomers such as acrylonitrile; halogen-containing monomers such as vinyl chloride; unsaturated carboxylic acids such as acrylic acid and methacrylic acid; unsaturated dibasic acids; unsaturated dibasic acid anhydrides; polymers of a nitro monomer or copolymers of the nitro monomer with a styrene-based monomer; polyester; and epoxy resins. More preferable examples of the polar resin include copolymers of styrene with acrylic acid, copolymers of styrene with methacrylic acid, maleic acid copolymers, saturated or unsaturated polyester resins, and epoxy resins.

Examples of the polymerization initiator to be used include: azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide polymerization initiators such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis(4,4-t-butyl peroxy cyclohexyl)propane, and tris-(t-butyl peroxi)triazine, or a polymer initiator having a peroxide in its side chain, persulfate such as potassium persulfate, and ammonium persulfate, or hydrogen peroxide.

Those polymerization initiators are preferably added in an amount of 0.5 to 20 parts by mass with respect to 100 parts by mass of the polymerizable monomer, and may be used each singly or in combination.

In addition, in the present invention, a known crosslinking agent or a chain transfer agent may be added for controlling the molecular weight of the binder resin of toner particles. The addition amount of the crosslinking agent or chain transfer agent is preferably 0.001 to 15 parts by mass with respect to 100 parts by mass of the polymerizable monomer.

A suitable dispersion stabilizer may be contained in the dispersing medium used at the time of producing the polymerization method toner by a polymerization method using an emulsion polymerization, dispersion polymerization, suspension polymerization, seed polymerization and hetero agglomeration method. Examples of inorganic compounds usable as a dispersion stabilizer include tricalcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica, and alumina. Examples of organic compounds usable as a dispersion stabilizer include polyvinyl alcohol, gelatin, methylcellulose, methylhydroxypropylcellulose, ethylcellulose, a sodium salt of carboxymethylcellulose, polyacrylic acid and a salt of the acid, starch, polyacrylamide, polyethyleneoxide, poly(hydroxy stearic acid-g-methyl methacrylate-eu-methacrylic acid) copolymer, and a nonionic surfactant or an ionic surfactant.

In addition, in the case where the emulsion polymerization method and hetero agglomeration method are used, anionic surfactants, cationic surfactants, ampholytic surfactants and nonionic surfactants may be used. The stabilizers are preferably used in an amount of 0.2 to 30 parts by mass with respect to 100 parts by mass of the polymerizable monomer.

When an inorganic compound is used for the dispersion stabilizer, a commercially available inorganic compound may be used as it is. Alternatively, the inorganic compound may be produced in the dispersing medium in order to obtain fine particles.

In addition, a surfactant may be used in an amount of 0.001 to 0.1 part by mass with respect to 100 parts by mass of the polymerizable monomer to finely disperse the dispersion stabilizer. This is aimed at promoting the intended action of the above dispersion stabilizer. Specific examples of the surfactant include sodium dodecylbenzenesulfonate, sodium tetradecyl sulfate, sodium pentadecyl sulfate, sodium octyl sulfate, sodium oleate, sodium laurate, potassium stearate, and calcium oleate.

Methods of measuring the physical properties of the hydrophobic inorganic fine particles of the present invention will be described below.

[Hydrophobicity Degree of Hydrophobic Inorganic Fine Particles]

The wettability of the hydrophobic inorganic fine particles with respect to a mixed solvent of methanol and water, that is, the hydrophobicity degree is determined from a transmittance curve by methanol dropping obtained as below.

First, 70 ml of a water-containing methanol liquid composed of 65 vol % of methanol and 35 vol % of water are placed in a cylindrical glass container having a diameter of 5 cm and a thickness of 1.75 mm, and is subjected to dispersion by means of an ultrasonic dispersing device for 5 minutes in order that bubbles and the like in a sample for measurement can be removed.

Next, 0.1 g of the hydrophobic inorganic fine particles is precisely weighed, and is added to the container containing the above water-containing methanol liquid, whereby a sample liquid for measurement is prepared.

Then, the sample liquid for measurement is set in a powder wettability tester "WET-100P" (manufactured by RHESCA), and is stirred with a magnetic stirrer at a speed of 6.7 s$^{-1}$ (400 rpm). It should be noted that a spindle rotor coated with a fluorine resin and having a length of 25 mm and a maximum middle diameter of 8 mm is used as the rotor of the magnetic stirrer.

Next, the transmittance curve by methanol dropping as shown in FIG. 1 is prepared by measuring the transmittance of light having a wavelength of 780 nm through the sample liquid for measurement while continuously adding methanol to the sample liquid for measurement through the above apparatus at a dropping rate of 1.3 ml/min.

[Measurement of Specific Surface Area]

The specific surface area of the hydrophobic inorganic fine particles is measured as follows: in accordance with a BET specific surface area method, a nitrogen gas is caused to adsorb on the surfaces of the sample with a specific surface area-measuring apparatus Gemini 2375 (manufactured by Shimadzu Corporation), and the specific surface area is calculated by using a BET specific surface area multipoint method.

[Toner Particle Diameter]

The weight average particle diameter (D4) and number average particle diameter (D1) of the toner are calculated as follows. As a measurement device, a precision grain size distribution measuring apparatus is used which is in accordance with a pore electrical resistance method and is provided with a 100-μm aperture tube "Coulter Counter Multisizer 3" (trademark, manufactured by Beckman Coulter, Inc). The dedicated software attached thereto "Beckman Coulter Multisizer 3 Version 3.51" (manufactured by Beckman Coulter, Inc) is used for setting measurement conditions and analyzing measurement data. In addition, the measurement is performed while the number of effective measurement channels is set to 25,000.

An electrolytic aqueous solution prepared by dissolving special grade sodium chloride in ion-exchanged water to have a concentration of about 1 mass %, for example, an "ISOTON II" (manufactured by Beckman Coulter, Inc), can be used in the measurement.

It should be noted that the dedicated software was set as described below prior to the measurement and analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc) is set as a Kd value. A threshold and a noise level are automatically set by pressing a "threshold/noise level measurement" button. In addition, a current is set to 1,600 μA, a gain is set to 2, and an electrolyte solution is set to an ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, particle diameter bins are set to 256 particle diameter bins, and a particle diameter range is set to be from 2 μm to 60 μm.

A specific measurement method is as described below.

(1) About 200 ml of the electrolytic aqueous solution is placed in a 250-ml round-bottom beaker made of glass dedicated to Multisizer 3. The beaker is set in a sample stand, and the electrolytic aqueous solution in the beaker is stirred with a stirrer rod at 24 rotations/sec in a counterclockwise direction. Then, dirt and air bubbles in the aperture tube are removed by the "aperture flush" function of the dedicated software.

(2) About 30 ml of the electrolytic aqueous solution is placed in a 100-ml flat-bottom beaker made of glass. About 0.3 ml of a diluted solution prepared by diluting approximately 3 times by mass a "Contaminon N" (a 10 mass % aqueous solution of a neutral detergent for washing a precision measuring device, which includes a nonionic surfactant, an anionic surfactant and an organic builder and has pH of 7, produced by Wako Pure Chemical Industries, Ltd.) with ion-exchanged water is added as a dispersant to the electrolytic aqueous solution.

(3) An ultrasonic dispersing device "Ultrasonic Dispension System Tetora 150" (manufactured by Nikkaki Bios Co., Ltd.) having an electrical output of 120 W is prepared in which two oscillators each having an oscillatory frequency of 50 kHz are set in such a state that their phases are shifted by 180° from each other. About 3.3 l of ion-exchanged water is placed in the water tank of the ultrasonic dispersing device. About 2 ml of the Contaminon N is placed in the water tank.

(4) The beaker in the above (2) is set in a beaker fixing hole of the ultrasonic dispersing device, and the ultrasonic dispersing device is operated. Then, the height position of the beaker is adjusted in order that the resonance state of the liquid level of the electrolytic aqueous solution is maximum.

(5) About 10 mg of toner is little by little added to and dispersed in the electrolytic aqueous solution in the beaker in the above (4) in a state in which an ultrasonic wave is applied to the electrolytic aqueous solution. Then, the ultrasonic dispersion process is further continued for 60 seconds. It should be noted that in carrying out the ultrasonic dispersion, the temperature of water in the water tank is appropriately adjusted so as to be 10° C. or higher and 40° C. or lower.

(6) The electrolytic aqueous solution in the above (5) in which the toner has been dispersed is dropwise added with a pipette to the round-bottom beaker in the above (1) placed in the sample stand, and the concentration of the toner to be measured is adjusted to about 5%. Then, measurement is performed until the particle diameters of 50,000 particles are measured.

(7) The measurement data is analyzed with the dedicated software attached to the apparatus, and the weight average particle diameter (D4) and number average particle diameter (D1) of the toner are calculated. It should be noted that the "average diameter" on the "analysis/volume statistics (arithmetic average)" screen of the dedicated software when the dedicated software is set to show a graph in a vol % unit is the weight average particle diameter (D4), and an "average diameter" on the "analysis/number statistics (arithmetic average)" screen of the dedicated software when the dedicated software is set to show a graph in a number % unit is the number average particle diameter (D1).

[Method of Calculating Fine Powder Amount]

A fine powder amount (number %) on the basis of number in the toner is calculated by analyzing data after the measurement with the Multisizer 3.

For example, the number % of particles having a particle diameter of 4.0 μm or less in the toner is calculated by the following procedure. First, the chart of the measurement results is displayed in terms of number % by setting the dedicated software to "graph/number %." Then, a check mark is placed in "<" of the particle diameter-setting portion in the "format/particle diameter/particle diameter statistics" screen, and "4" is input in the particle diameter-inputting portion below the particle diameter-setting portion. The numerical value in the "<4 μm" display portion when the "analysis/number statistic (arithmetic average)" screen is displayed is the number % of the particles having a particle diameter of 4.0 μm or less in the toner.

[Method of Calculating Coarse Powder Amount]

A coarse powder amount (vol %) on the basis of volume in the toner is calculated by analyzing the data after the measurement with the Multisizer 3.

For example, the vol % of particles having a particle diameter of 10.0 μm or more in the toner is calculated by the following procedure. First, the chart of the measurement results is displayed in terms of vol % by setting the dedicated software to "graph/vol %." Then, a check mark is placed in ">" of the particle diameter-setting portion in the "format/particle diameter/particle diameter statistics" screen, and "10" is input in the particle diameter-inputting portion below the particle diameter-setting portion. The numerical value in the ">10 μm" display portion when the "analysis/volume statistic (arithmetic average)" screen is displayed is the vol % of the particles having a particle diameter of 10.0 μm or more in the toner.

EXAMPLES

Hereinafter, the present invention is described specifically by way of examples. However, the present invention is not limited to them in any way.

Hydrophobic Inorganic Fine Particle Production Example 1

Untreated dry silica (raw silica) (number-average primary particle diameter=12 nm, BET specific surface area 200 $m^2/g$) was placed in an autoclave provided with a stirrer, and was heated to 250° C. in a fluidized state by stirring.

The inside of the reactor was replaced with a nitrogen gas, and the reactor was hermetically sealed. Then, 20 parts by mass of dimethyl silicone oil (viscosity=50 $mm^2/s$) was sprayed onto 100 parts by mass of the raw silica, and the resultant was continuously stirred for 30 minutes. After that, the temperature of the resultant was raised to 300° C. while the resultant was stirred, and then the resultant was stirred for an additional 2 hours, whereby first silicone oil treatment was completed. At this stage, the immobilization ratio of the silicone oil subjected to the first treatment was checked, and was found to be 98%.

After that, the temperature of the reactor was lowered to 250° C., and 30 parts by mass of hexamethyldisilazane with respect to 100 parts by mass of the raw silica was sprayed into the reactor together with water vapor, and the resultant was treated in a fluidized state while being stirred. The reaction was continued for 60 minutes, and was then completed. After the completion of the reaction, the pressure in the autoclave was reduced, and then the autoclave was subjected to purge by a nitrogen gas stream, to thereby remove excessive hexamethyldisilazane and by-products from the hydrophobic silica.

Further, the temperature in the reactor was kept at 250° C. Then, 5 parts by mass of dimethyl silicone oil (viscosity=100 mm$^2$/s) was sprayed onto 100 parts by mass of the raw silica while the inside of the reactor was stirred, and the resultant was stirred for 2 hours. After that, the resultant was taken out, whereby Hydrophobic Inorganic Fine Particles 1 used in the present invention were obtained. In Hydrophobic Inorganic Fine Particles 1 thus obtained, an immobilization ratio of the silicone oils is 79%, and an immobilization ratio of the silicone oil used in the second silicone oil treatment is 3%. In addition, as to wettability with respect to a mixed solvent of methanol and water, a methanol concentration when a transmittance of light having a wavelength of 780 nm was 80% was 81 vol %, and a methanol concentration when the transmittance was 90% was 80 vol %. Table 1 shows the physical properties of Hydrophobic Inorganic Fine Particles 1. In addition, FIG. 1 illustrates the transmittance curve by methanol dropping of Hydrophobic Inorganic Fine Particles 1.

Hydrophobic Inorganic Fine Particle Production Examples 2 and 3

Hydrophobic Inorganic Fine Particles 2 and 3 were obtained in the same manner as in Hydrophobic Inorganic Fine Particles 1 except that the raw silica, the viscosities and addition amounts of the silicone oils and the addition amount of hexamethyldisilazane were changed as shown in Table 1. Table 1 shows the physical properties of Hydrophobic Inorganic Fine Particles 2 and 3.

Hydrophobic Inorganic Fine Particle Production Example 4

Hydrophobic Inorganic Fine Particles 4 were obtained in the same manner as in Hydrophobic Inorganic Fine Particles 1 except that: the raw silica, the viscosities and addition amounts of the silicone oils, and the addition amount of hexamethyldisilazane were changed as shown in Table 1; and the temperature in the first silicone oil treatment was changed to 120° C. Table 1 shows the physical properties of Hydrophobic Inorganic Fine Particles 4.

Hydrophobic Inorganic Fine Particle Production Example 5

Hydrophobic Inorganic Fine Particles 5 were obtained in the same manner as in Hydrophobic Inorganic Fine Particles 4 except that: the raw silica, the viscosities and addition amounts of the silicone oils, and the addition amount of hexamethyldisilazane were changed as shown in Table 1; and no water vapor was blown at the time of the treatment with hexamethyldisilazane. Table 1 shows the physical properties of Hydrophobic Inorganic Fine Particles 6.

Hydrophobic Inorganic Fine Particle Production Example 6

Untreated dry silica (raw silica) (number-average primary particle diameter=25 nm, BET specific surface area 70 m$^2$/g) was placed in an autoclave provided with a stirrer, and was stirred at room temperature and brought into a fluidized state.

The air in the reactor was replaced with a nitrogen gas, and the reactor was hermetically sealed. Then, 1.5 parts by mass of dimethyl silicone oil (viscosity=1,500 mm$^2$/s) and 50 parts by mass of hexamethyldisilazane were sprayed onto 100 parts by mass of the raw silica, and the resultant was continuously stirred for 30 minutes. After that, the temperature of the resultant was raised to 150° C. while the resultant was stirred, and then the resultant was stirred for an additional 2 hours, whereby first silicone oil treatment and hexamethyldisilazane treatment was performed simultaneously.

Then, the pressure in the autoclave was reduced, and then the autoclave was subjected to purge by in a nitrogen gas stream, to thereby remove excessive hexamethyldisilazane and by-products from the hydrophobic silica. Further, the temperature in the reactor was kept at 150° C. Then, 0.5 parts by mass of dimethyl silicone oil (viscosity=1,500 mm$^2$/s) was sprayed onto 100 parts by mass of the raw silica while the inside of the reactor was stirred, and the resultant was stirred for 2 hours. After that, the resultant was taken out, whereby Hydrophobic Inorganic Fine Particles 6 used in the present invention were obtained. Table 1 shows the physical properties of Hydrophobic Inorganic Fine Particles 6. In addition, FIG. 1 illustrates the transmittance curve by methanol dropping of Hydrophobic Inorganic Fine Particles 6.

Hydrophobic Inorganic Fine Particle Production Example 7

Hydrophobic Inorganic Fine Particles 7 were obtained in the same manner as in Hydrophobic Inorganic Fine Particles 6 except that: the raw silica, and the viscosities and addition amounts of the silicone oils were changed as shown in Table 1; and 1 part by mass of dimethyldichlorosilane was used instead of hexamethyldisilazane. Table 1 shows the physical properties of Hydrophobic Inorganic Fine Particles 7.

Hydrophobic Inorganic Fine Particle Production Example 8

Hydrophobic Inorganic Fine Particles 8 were obtained in the same manner as in Hydrophobic Inorganic Fine Particles 6 except that: the raw silica was changed to a titanium oxide base; the viscosities and addition amounts of the silicone oils were changed as shown in Table 1; and 50 parts by mass of isobutyltrimethoxysilane were used instead of hexamethyldisilazane. Table 1 shows the physical properties of Hydrophobic Inorganic Fine Particles 8.

Hydrophobic Inorganic Fine Particle Production Example 9

Untreated dry silica (number-average primary particle diameter=25 nm, BET specific surface area 70 m$^2$/g) was placed in an autoclave provided with a stirrer, and was stirred at room temperature and brought into a fluidized state.

The air in the reactor was replaced with a nitrogen gas, and the reactor was hermetically sealed. Then, 3 parts by mass of hexamethyldisilazane was sprayed onto 100 parts by mass of the raw silica, and the resultant was continuously stirred for 30 minutes. After that, the temperature of the resultant was raised to 150° C. while the resultant was stirred, and then the resultant was stirred further for 2 hours, whereby hexamethyldisilazane treatment was performed.

Then, the pressure in the autoclave was reduced, and then the autoclave was subjected to purge by a nitrogen gas stream, to thereby remove excessive hexamethyldisilazane and by-products from the hydrophobic silica. Further, the temperature in the reactor was kept at 150° C. Then, 2 parts by mass of dimethyl silicone oil (viscosity=2,000 mm$^2$/s) was sprayed onto 100 parts by mass of the raw silica while the inside of the reactor was stirred, and the resultant was stirred for 2 hours.

After that, the resultant was taken out, whereby Hydrophobic Inorganic Fine Particles 9 used in the present invention were obtained. Table 1 shows the physical properties of Hydrophobic Inorganic Fine Particles 9.

Hydrophobic Inorganic Fine Particle Production Example 10

Untreated dry silica (number-average primary particle diameter=25 nm, BET specific surface area 70 m²/g) was loaded into an autoclave provided with a stirrer, and was heated to 150° C. in a fluidized state by stirring.

The air in the reactor was replaced with a nitrogen gas, and the reactor was hermetically sealed. Then, 15 parts by mass of dimethyl silicone oil (viscosity=2,000 mm²/s) was sprayed onto 100 parts by mass of the raw silica, and the resultant was continuously stirred for 30 minutes. After that, the temperature of the resultant was raised to 200° C. while the resultant was stirred, and then the resultant was stirred further for 2 hours, whereby first silicone oil treatment was completed. The immobilization ratio of the silicone oil in the first treatment was found to be 63%. Further, 5 parts by mass of a dimethyl silicone oil (viscosity=2,000 mm²/s) was sprayed onto 100 parts by mass of the raw silica while the inside of the reactor was stirred, and the resultant was stirred for 2 hours. After that, the resultant was taken out, whereby Hydrophobic Inorganic Fine Particles 10 used in the present invention were obtained. In Hydrophobic Inorganic Fine Particles 10 thus obtained, an immobilization ratio of the silicone oils is 49% and an immobilization ratio of the silicone oil used in the second silicone oil treatment is 8%. Table 1 shows the physical properties of Hydrophobic Inorganic Fine Particles 10.

Hydrophobic Inorganic Fine Particle Production Example 11

Untreated dry silica (raw silica) (number-average primary particle diameter=12 nm, BET specific surface area 200 m²/g) was placed in an autoclave provided with a stirrer, and was heated to 250° C. in a fluidized state by stirring.

The air in the reactor was replaced with a nitrogen gas, and the reactor was hermetically sealed. Then, 20 parts by mass of a dimethyl silicone oil (viscosity=50 mm²/s) was sprayed onto 100 parts by mass of the raw silica, and the resultant was continuously stirred for 30 minutes, whereby first silicone oil treatment was completed. At this stage, the immobilization ratio of the silicone oil in the first treatment was checked, and was found to be 81%.

After that, the temperature of the reactor was kept at 250° C., and 10 parts by mass of hexamethyldisilazane with respect to 100 parts by mass of the raw silica was sprayed into the reactor, and the resultant was treated in a fluidized state while being stirred. The reaction was continued for 30 minutes, and was then completed. After the completion of the reaction, the pressure in the autoclave was reduced, and then the autoclave was subjected to purge by in a nitrogen gas stream so, to thereby remove excessive hexamethyldisilazane and by-product from the hydrophobic silica, whereby Hydrophobic Inorganic Fine Particles 11 used in the present invention were obtained.

TABLE 1

| Hydrophobic Inorganic Fine Particles | Raw silica BET | Silicone oil used in first treatment ||| Silane compound or silazane compound ||
|---|---|---|---|---|---|---|
| | | Viscosity (mm²/s) | Addition amount (part(s) by mass) | Immobilization ratio (%) | Type | Addition amount (part(s) by mass) |
| 1 | 200 | 50 | 20 | 98 | HMDS | 30 |
| 2 | 110 | 200 | 7 | 84 | HMDS | 8 |
| 3 | 300 | 20 | 30 | 74 | HMDS | 40 |
| 4 | 380 | 20 | 30 | 61 | HMDS | 40 |
| 5 | 380 | 1,500 | 5 | 35 | HMDS | 50 |
| 6 | 70 | 1,500 | 1.5 | 4 | HMDS | 50 |
| 7 | 470 | 1,500 | 2 | 95 | DCDMS | 1 |
| 8 | 70 (TiO2) | 2,000 | 1.5 | 4 | iBTMS | 50 |
| 9 | 70 | — | — | — | HMDS | 3 |
| 10 | 70 | 2,000 | 15 | 63 | — | — |
| 11 | 200 | 50 | 20 | 81 | HMDS | 10 |

| Hydrophobic Inorganic Fine Particles | Silicone oil used in second treatment || Total addition amount and immobilization ratio of silicone oils || Wettability for mixed solvent of methanol and water (vol %) ||
|---|---|---|---|---|---|---|
| | Viscosity (mm²/s) | Addition amount (part(s) by mass) | Immobilization ratio (%) | Addition amount (part(s) by mass) | Immobilization ratio (%) | When light transmittance is 90% | When light transmittance is 80% |
| 1 | 100 | 5 | 3 | 25 | 79 | 80 | 81 |
| 2 | 500 | 3 | 24 | 10 | 66 | 79 | 80 |
| 3 | 1,000 | 15 | 16 | 45 | 55 | 77 | 79 |
| 4 | 1,500 | 20 | 29 | 50 | 48 | 75 | 77 |
| 5 | 1,500 | 45 | 4 | 50 | 7 | 73 | 76 |
| 6 | 1,500 | 0.5 | 6 | 2 | 5 | 70 | 75 |
| 7 | 1,500 | 2 | 91 | 4 | 93 | 69 | 73 |
| 8 | 1,500 | 0.5 | 6 | 2 | 5 | 68 | 71 |
| 9 | 2,000 | 2 | 7 | 2 | 7 | 68 | 70 |

TABLE 1-continued

| 10 | 2,000 | 5 | 8 | 20 | 49 | 66 | 69 |
| 11 | — | — | — | 20 | 81 | 69 | 70 |

Abbreviations in table
HMDS: Hexamethyldisilazane
DCDMS: Dichlorodimethylsilane
iBTMS: Isobutyltrimethoxysilane

[Binder Resin Production Example]

| Terephthalic acid | 18 parts by mass |
| Isophthalic acid | 3 parts by mass |
| Trimellitic anhydride | 7 parts by mass |
| Bisphenol derivative represented by formula (A) (R: propylene group, x + y = 2.2) | 70 parts by mass |
| 5.6-mol EO adduct of novolac type phenol resin (number of nuclei about 5.6) | 2 parts by mass |

0.5 part by mass of tetrabutyl titanate was added as a catalyst to those materials, and the mixture was subjected to condensation polymerization at 240° C., whereby a crosslinked polyester resin (Tg=56° C., number-average molecular weight=6,700, weight-average molecular weight=87,000, tetrahydrofuran insoluble matter=14 mass %) was obtained.

[Toner Particle Production Example]

| Polyester resin described above | 100 parts by mass |
| Magnetite (number-average particle diameter 0.18 μm) | 100 parts by mass |
| Polyethylene wax (DSC peak temperature = 101° C., Mn = 850) | 3 parts by mass |
| Azo-based iron compound (1) described above (using $NH_4^+$ as a counter ion) | 2 parts by mass |

The above raw materials were preliminarily mixed by means of a Henschel mixer. After that, the mixture was kneaded with a biaxial kneading extruder (PCM-30: manufactured by Ikegai, Ltd.) with its temperature and number of revolutions set to 120° C. and 250 rpm, respectively. The resultant molten kneaded product was cooled, and the cooled molten kneaded product was coarsely pulverized with a cutter mill. The resultant coarsely pulverized products were finely pulverized by means of a Turbo mill T-250 (manufactured by Turbo Kogyo Co., Ltd.) where an air temperature was adjusted so that an exhaust gas temperature was 45° C. Then, the finely pulverized products were classified with a multi-division classifier utilizing a Coanda effect, whereby magnetic toner particles were obtained. In the magnetic toner particles, the weight-average particle diameter (D4) is 7.1 μm, and the content of particles having a particle diameter of 2.0 μm or more and 4.0 μm or less in the number distribution is 16.2 number %.

Examples 1 to 8

1.0 part by mass of any one of Hydrophobic Inorganic Fine Particles 1 to 8 was externally added to 100 parts by mass of the magnetic toner particles, and was mixed by means of a Henschel mixer, whereby Toners 1 to 8 were obtained.

Comparative Examples 1 to 3

1.0 part by mass of any one of Hydrophobic Inorganic Fine Particles 9 to 11 was externally added to 100 parts by mass of the magnetic toner particles, and was mixed by means of a Henschel mixer, whereby Toners 9 to 11 were obtained.

Each of Toners 1 to 11 described above was evaluated by using as an image output test machine a commercially available laser beam printer (Laser Jet 4350 manufactured by Hewlett-Packard Company) so modified as to be capable of printing 60 sheets of A4-size paper per minute (a process speed of 370 mm/sec). A normal-temperature, normal-humidity environment (having a temperature of 23° C. and a humidity of 60%) and a high-temperature, high-humidity environment (having a temperature of 32° C. and a humidity of 85%) were each employed as an image output environment. A 10,000-sheet print test was performed according to a mode set as follows: the printing of a horizontal line pattern having a print percentage of 4% on two sheets was defined as one job, and the machine paused once between a job and a next job before the next job started. Each of the toners was evaluated for its durability on the basis of image density at the initial stage of the print test, image density after printing 10,000 sheets, and fogging.

In addition, in order to check the performance of each of the toners after storage in a high-temperature, high-humidity environment, the toner was placed in a cartridge and left to stand while being exposed to a high-temperature, high-humidity storage environment (having a temperature of 40° C. and a humidity of 95%) for 30 days, and was then evaluated. First, fogging was observed in a normal-temperature, normal-humidity environment (having a temperature of 23° C. and a humidity of 60%), and then the same print test as in the above was performed in a high-temperature, high-humidity environment (having a temperature of 32° C. and a humidity of 85%). After the completion of the print test, evaluations for the following items were performed: image density, image quality, melt adhesion of the toner to a photosensitive member, and defective charging due to the contamination of a contact charging member.

Figure 2:
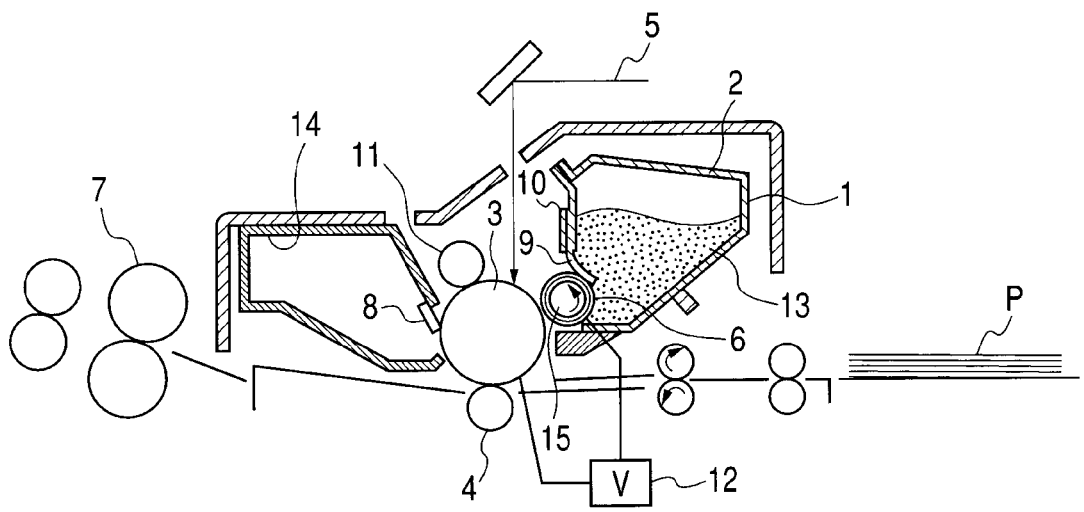
FIG. 2 is a schematic view illustrating an example of an image-forming apparatus suitable for performing image formation with a magnetic toner of the present invention.
Figure 3:
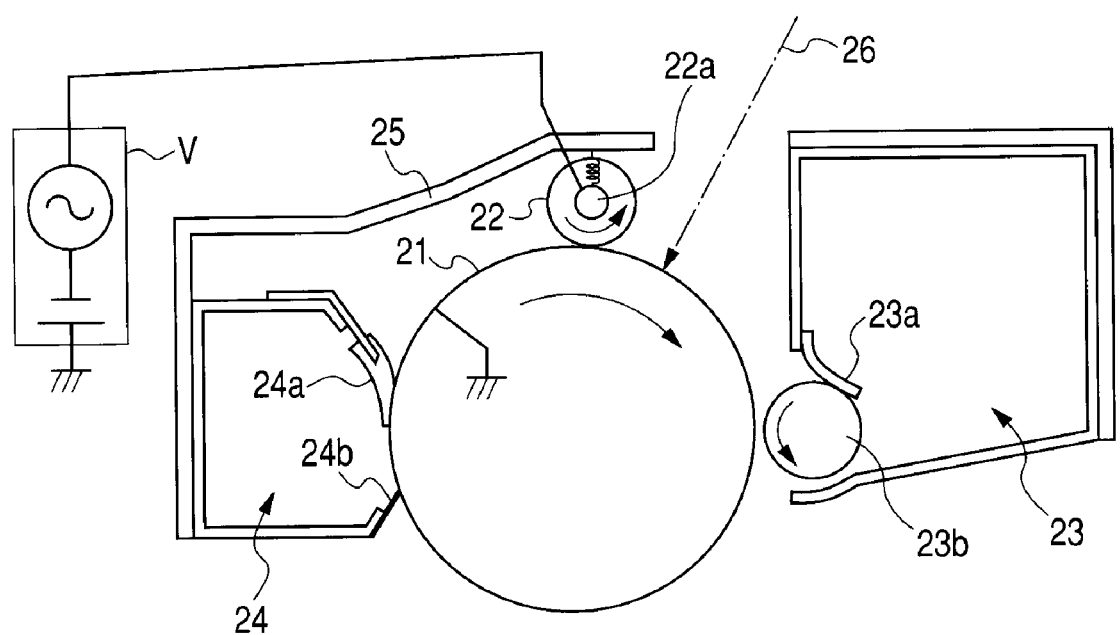
FIG. 3 is an outline view illustrating an example of a process cartridge suitable for performing image formation with the magnetic toner of the present invention.

FIG. 2 is a schematic view illustrating the image-forming apparatus used in the image output test, and FIG. 3 is a schematic view illustrating the process cartridge.

With regard to the image density, the reflection density of a 5-mm square, solid black image was measured with a Macbeth Densitometer (manufactured by Macbeth Co.) using an SPI filter.

With regard to the fogging, the reflection densities of a transfer material before and after the formation of a solid white image were measured with a reflection densitometer (REFLECTOMETER MODEL TC-6DS manufactured by Tokyo Denshoku CO., LTD.). The worst value of the reflection density after the image formation was represented by Ds, the average reflection density of the transfer material before the image formation was represented by Dr, and a numerical value of "Dr-Ds" was found. The evaluation was performed by using the numerical value as a fogging amount. The smaller the numerical value, the more the fogging is suppressed.

With regard to the image quality, an independent, one-dot halftone pattern was output, and was evaluated for reproducibility with an optical microscope according to the following criteria.

A: An edge portion of each dot is sharp, and almost no toner scattering is observed around the dot.
B: An edge portion of each dot is sharp, but slight toner scattering is observed around the dot.
C: Scattering is somewhat significant, and an edge portion is blurred.
D: Some dots are not developed.

With regard to the melt adhesion of each toner to a photosensitive member, conditions under which the melt adhesion of the toner to the surface of the photosensitive member occurred and an influence of the melt adhesion on an image that had been printed out were visually evaluated.

After a 10,000-sheet image output test in a high-temperature, high-humidity environment (having a temperature of 32° C. and a humidity of 80%) following the storage of each toner in a high-temperature, high-humidity environment (having a temperature of 40° C. and a humidity of 95%) for 30 days, solid black images were continuously printed out on 50 sheets, and the occurrence of dripping was occurring was judged on the basis of black spots due to dripping toner and the level of contamination inside the image-forming apparatus.

A: No dripping occurs.
B: Black spots having a diameter of 1 mm or less is observed in an image.
C: Black spots having a diameter larger than 1 mm is observed in an image.
D: The dripping toner scatters in the image-forming apparatus, and the inside of the apparatus is contaminated with the toner.

Table 2 shows the evaluations results.

TABLE 2

| | Normal-temperature, normal-humidity environment | | | High-temperature, high-humidity environment | | After storage for 30 days in high-temperature, high-humidity environment | | | Adhesion of toner to contact charging member | Melt adhesion of toner to photosensitive member | Black spots and scattering in image-forming apparatus | Image quality |
|---|---|---|---|---|---|---|---|---|---|---|---|---|
| | Initial stage | After printing 10,000 sheets | Fogging | Initial stage | After printing 10,000 sheets | Normal-temperature, normal-humidity environment Fogging | Initial stage | After printing 10,000 sheets | | | | |
| Example 1 | 1.54 | 1.54 | 0.2 | 1.52 | 1.50 | 0.4 | 1.51 | 1.47 | A | A | A | A |
| Example 2 | 1.54 | 1.53 | 0.2 | 1.52 | 1.49 | 0.7 | 1.50 | 1.46 | A | A | B | A |
| Example 3 | 1.52 | 1.50 | 0.3 | 1.50 | 1.48 | 1.1 | 1.49 | 1.43 | A | A | B | B |
| Example 4 | 1.50 | 1.47 | 0.5 | 1.48 | 1.45 | 1.3 | 1.43 | 1.40 | B | A | B | B |
| Example 5 | 1.47 | 1.45 | 0.7 | 1.44 | 1.42 | 1.9 | 1.40 | 1.36 | B | B | B | C |
| Example 6 | 1.46 | 1.44 | 1 | 1.40 | 1.37 | 2.7 | 1.33 | 1.28 | B | C | C | C |
| Example 7 | 1.43 | 1.40 | 1.6 | 1.39 | 1.32 | 3.9 | 1.29 | 1.20 | C | C | C | C |
| Example 8 | 1.36 | 1.31 | 1.8 | 1.30 | 1.26 | 4.1 | 1.24 | 1.12 | C | D | C | C |
| Comparative Example 1 | 1.35 | 1.30 | 2.2 | 1.29 | 1.24 | 5.6 | 1.11 | 1.02 | D | D | D | D |
| Comparative Example 2 | 1.22 | 1.15 | 3.9 | 1.18 | 1.03 | 7.1 | 1.00 | 0.89 | D | D | D | D |
| Comparative Example 3 | 1.33 | 1.31 | 2.1 | 1.30 | 1.25 | 4.9 | 1.20 | 1.10 | D | D | C | C |

A: No melt adhesion occurs.
B: The melt adhesion of the toner occurs, but is slight and inconspicuous.
C: The melt adhesion of the toner is significant, and image defects, i.e., spot-like blank areas in a solid black image, are conspicuous.
D: The melt adhesion of the toner greatly occurs, and image defects, i.e., linear blank areas several millimeters in length, are conspicuous.

With regard to the defective charging due to the adhesion of each toner to a contact charging member, conditions under which the toner adhered to the surface of the contact charging member and an influence of the adhesion on an image that had been printed out were visually evaluated.

A: Nearly no contamination is observed in the contact charging member.
B: Slight contamination is observed in the contact charging member, but has no influence on the image.
C: The image is slightly affected by contamination.
D: The image is terribly affected.

This application claims the benefit of Japanese Patent Application No. 2008-129044, filed May 16, 2008, which is hereby incorporated by reference herein in its entirety.

What is claimed is:

1. Hydrophobic inorganic fine particles which have been subjected to the following treatment (1) or (2):
   (1) surface treatment with silicone oil, and then, with one or two or more types of treatment agents selected from the group consisting of silane compounds and silazane compounds; or
   (2) surface treatment with one or two or more types of treatment agents selected from the group consisting of silane compounds and silazane compounds in the presence of silicone oil,
   and then further subjected to surface treatment with silicone oil.

2. The hydrophobic inorganic fine particles according to claim 1, wherein the hydrophobic inorganic fine particles are obtained by subjecting 100 parts by mass of the inorganic fine particles to the surface treatments with a total of 5 parts by mass or more and 50 parts by mass or less of the silicone oil.

3. The hydrophobic inorganic fine particles according to claim 1, wherein the hydrophobic inorganic fine particles have an immobilization ratio of the silicone oil of 10 mass % or more and 90 mass % or less.

4. The hydrophobic inorganic fine particles according to claim 1, wherein the inorganic fine particles are composed of silica.

5. A toner comprising:
   toner particles containing at least a binder resin and a colorant; and
   the hydrophobic inorganic fine particles according to claim 1,
   wherein the toner contains the hydrophobic inorganic fine particles in an amount of 0.1 part by mass or more and 5.0 parts by mass or less with respect to 100 parts by mass of the toner particles.

6. A method of producing hydrophobic inorganic fine particles, comprising:
   subjecting inorganic fine particles to surface treatment with silicone oil;
   treating the inorganic fine particles thus surface-treated by the following method (1) or (2):
   (1) a method in which the inorganic fine particles are subjected to surface treatment with one or two or more types of treatment agents selected from the group consisting of silane compounds and silazane compounds; or
   (2) a method in which the inorganic fine particles are subjected to surface treatment with one or more types of treatment agents selected from the group consisting of silane compounds and the silazane compounds in the presence of silicone oil; and
   further subjecting the inorganic fine particles treated by the method (1) or (2) to a surface treatment with a silicone oil.

* * * * *

UNITED STATES PATENT AND TRADEMARK OFFICE
CERTIFICATE OF CORRECTION

| | |
|---|---|
| PATENT NO. | : 7,811,734 B2 |
| APPLICATION NO. | : 12/562264 |
| DATED | : October 12, 2010 |
| INVENTOR(S) | : Ogawa et al. |

It is certified that error appears in the above-identified patent and that said Letters Patent is hereby corrected as shown below:

COLUMN 11
Line 57, "piperizine" should read --piperidine--.

COLUMN 15
Line 11, "fumalic" should read --fumaric--.

COLUMN 18
Line 52, "enpol" should read --empol--.

COLUMN 32
Line 18, "vinyl benzoate," should be deleted.

COLUMN 37
Line 55, "Particles 6" should read --Particles 5--.

Signed and Sealed this
First Day of March, 2011

David J. Kappos
*Director of the United States Patent and Trademark Office*